(12) United States Patent
Mochizuki et al.

(10) Patent No.: US 9,280,265 B2
(45) Date of Patent: Mar. 8, 2016

(54) INPUT CONTROL DEVICE, INPUT CONTROL METHOD, AND INPUT CONTROL PROGRAM FOR CONTROLLING DISPLAY TARGET UPON RECEIVING INPUT ON DISPLAY SCREEN OF DISPLAY DEVICE

(75) Inventors: Arito Mochizuki, Tokyo (JP); Tomoya Kitayama, Tokyo (JP); Yoshiyuki Imada, Chiba (JP); Phillip Profitt, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 498 days.

(21) Appl. No.: 13/609,509

(22) Filed: Sep. 11, 2012

(65) Prior Publication Data

US 2013/0100049 A1   Apr. 25, 2013

(30) Foreign Application Priority Data

Oct. 21, 2011 (JP) .................................. 2011-232192

(51) Int. Cl.
*G06F 3/0483* (2013.01)
*G06F 3/0485* (2013.01)
*G06F 3/0488* (2013.01)
*G06F 3/0484* (2013.01)

(52) U.S. Cl.
CPC ............ *G06F 3/0483* (2013.01); *G06F 3/0485* (2013.01); *G06F 3/04842* (2013.01); *G06F 3/04883* (2013.01); *G06F 2203/04806* (2013.01)

(58) Field of Classification Search
None
See application file for complete search history.

(56) References Cited

U.S. PATENT DOCUMENTS

2010/0053221 A1*  3/2010  Kaneko et al. ................. 345/684
2011/0157053 A1*  6/2011  Webb et al. .................... 345/173

FOREIGN PATENT DOCUMENTS

JP    2010-86519    4/2010

OTHER PUBLICATIONS

Notification of Reason(s) for Refusal dated Sep. 10, 2013, from corresponding Japanese Application No. 2011-232192.

* cited by examiner

*Primary Examiner* — Kenneth B Lee, Jr.
(74) *Attorney, Agent, or Firm* — Katten Muchin Rosenman LLP

(57) ABSTRACT

A game device includes: a display control unit that displays a plurality of display targets on a display screen of a display device; an input acquiring unit that acquires a position of input from a front touch panel or a rear touch panel, which can detect input on the display screen; and a movement control unit that defines as a target to be moved a display target displayed by the display control unit on the display screen at a position corresponding to the position of a first input entry acquired by the input acquiring unit, and operative to scroll a display target other than the target to be moved in accordance with a second input entry acquired by the input acquiring unit while keeping the display position of the target to be moved at the position of the first input entry.

13 Claims, 19 Drawing Sheets

RELATED ART

INPUT CONTROL DEVICE, INPUT CONTROL METHOD, AND INPUT CONTROL PROGRAM FOR CONTROLLING DISPLAY TARGET UPON RECEIVING INPUT ON DISPLAY SCREEN OF DISPLAY DEVICE

BACKGROUND OF THE INVENTION

1. Field of the Invention

The present invention generally relates to input control technology, and more particularly, to an input control device, an input control method, and an input control program for controlling a display target upon receiving input on a display screen of a display device.

2. Description of the Related Art

Smart phones and portable game devices provided with a touch panel have become popular. A lot of users are familiarized with basic input operations on a touch panel, such as, tap input, flick input, swipe input, drag input, pinch input, or the like.

In the future, smart phones, portable game devices, or the like are expected to become more widely used. In this circumstance, a technology for providing a more easy-to-understand and user-friendly input method is required.

SUMMARY OF THE INVENTION

The present invention addresses the aforementioned issue, and a purpose thereof is to provide an input control technology with higher user friendliness.

According to an embodiment of the present invention, an input control program embedded on a non-transitory computer-readable recording medium is provided. The input control program allows a computer to function as: a display control unit operative to display a plurality of display targets on a display screen of a display device; an acquiring unit operative to acquire a position of input from an input device, which can detect input on the display screen; and a movement control unit operative to define as a target to be moved a display target displayed by the display control unit on the display screen at a position corresponding to the position of a first input entry acquired by the acquiring unit, and operative to scroll a display target other than the target to be moved in accordance with a second input entry acquired by the acquiring unit while keeping the display position of the target to be moved at the position of the first input entry.

Optional combinations of the aforementioned constituting elements, and implementations of the invention in the form of methods, apparatuses, systems, or the like may also be practiced as additional modes of the present invention.

DETAILED DESCRIPTION OF THE INVENTION

The invention will now be described by reference to the preferred embodiments. This does not intend to limit the scope of the present invention, but to exemplify the invention.

An input control device according to an exemplary embodiment includes a front touch panel, which is provided with a display screen of a display device, and a rear touch panel, which is provided on the back surface of the input control device. The input control device controls movement, deformation, and switch of a display object to be displayed on the display device in accordance with input on the front touch panel, the rear touch panel, or the like. In exemplary embodiments, explanations will be given on a game device as an example of the input control device.

Figure 1:
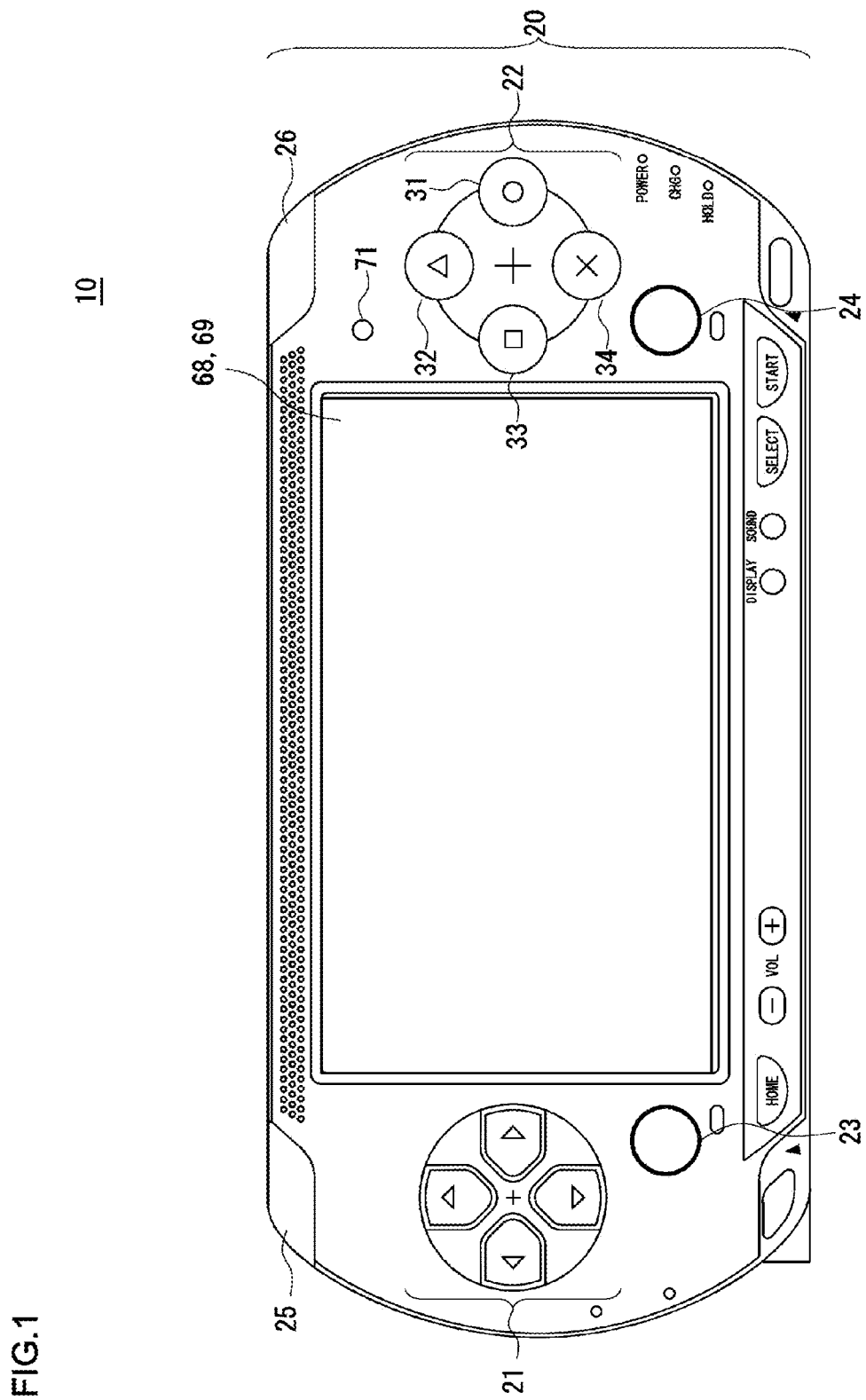
FIG. 1 shows an external view of a game device according to an exemplary embodiment.
Figure 2:
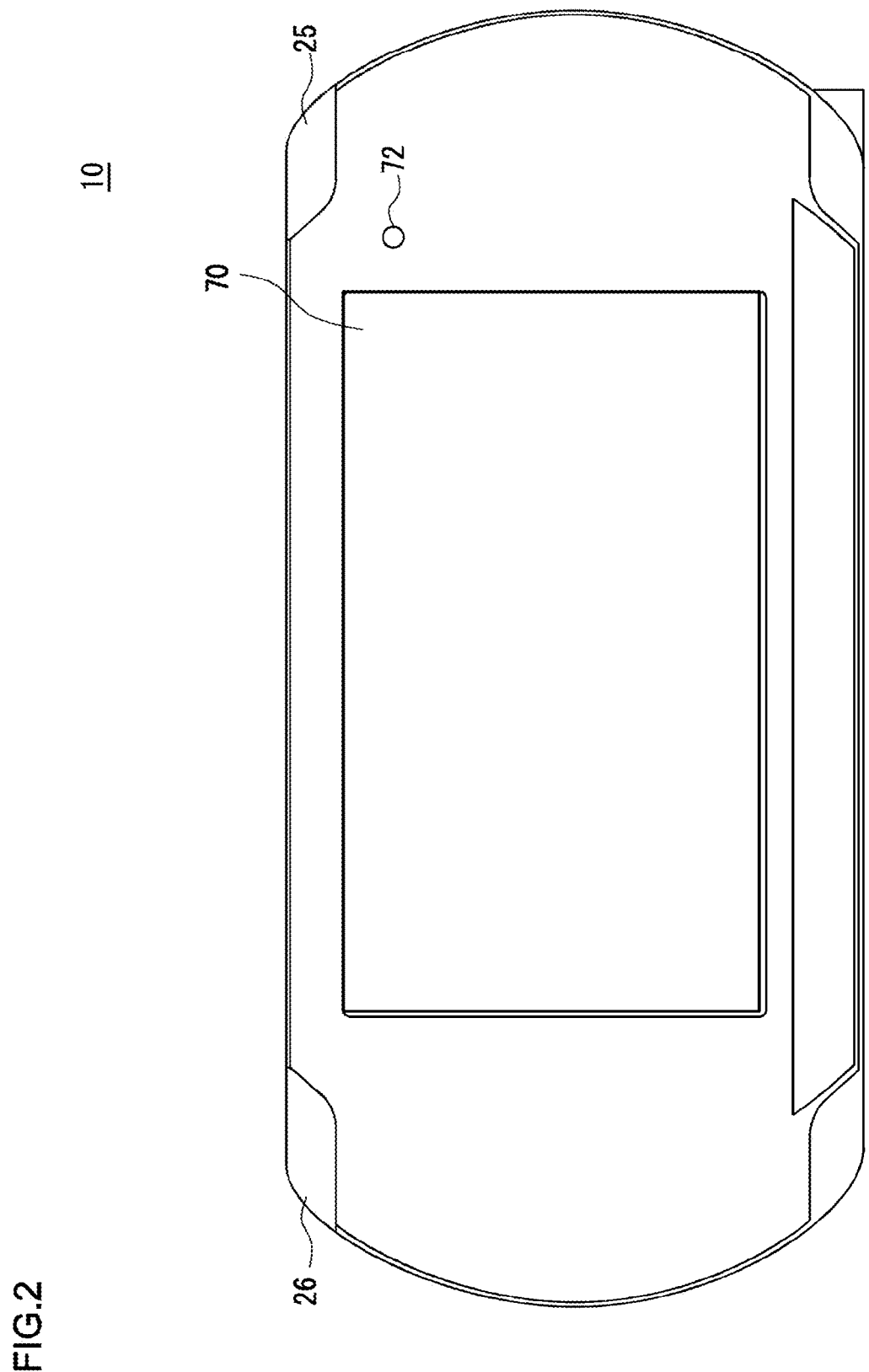
FIG. 2 shows an external view of the game device according to the exemplary embodiment.

FIGS. 1 and 2 show an external view of a game device 10 according to an exemplary embodiment. The game device 10 shown in FIGS. 1 and 2 are a portable game device that a player holds and uses. As shown in FIG. 1, on the front side of the game device 10 (i.e., the side facing to a player when the player holds and manipulates the game device 10, an input device 20 including directional keys 21, buttons 22, a left analogue stick 23, a right analogue stick 24, a left button 25, a right button 26, or the like, a display device 68, and a front camera 71 are provided. With the display device 68, a touch panel 69 for detecting contact made by a finger or a thumb of the player, a stylus pen, or the like is provided. The buttons 22 includes a circle button 31, a triangle button 32, a square button 33, and a cross button 34.

As shown in FIG. 2, on the backside of the game device 10, a rear touch panel 70 and a rear camera 72 is provided. Although a display device may be provided also on the backside of the game device 10 in a similar manner with that of the front side, a display device is not provided on the backside of the game device 10 and only the rear touch panel 70 is provided on the backside according to the exemplary embodiment.

A player can, for example, manipulate the buttons 22 with his/her right hand thumb, manipulate the directional keys 21 with his/her left hand thumb, manipulate the right button 26 with his/her right hand index finger or middle finger, manipulate the left button 25 with his/her left hand index finger or middle finger, manipulate the touch panel 69 with his/her thumbs of both hands, and manipulate the rear touch panel 70 with his/her ring fingers or pinky fingers of both hands while holding the game device 10 with his/her both hands. In case of using a stylus pen, or the like, for example, the player can manipulate the touch panel 69 and buttons 22 with the right hand using the stylus pen or using the index finger, manipulate the directional keys 21 with the left hand thumb, manipulate the left button 25 with the left hand index finger or middle finger, and manipulate the rear touch panel 70 with the left hand ring finger or the pinky finger while holding the game device 10 with the left hand.

Figure 3:
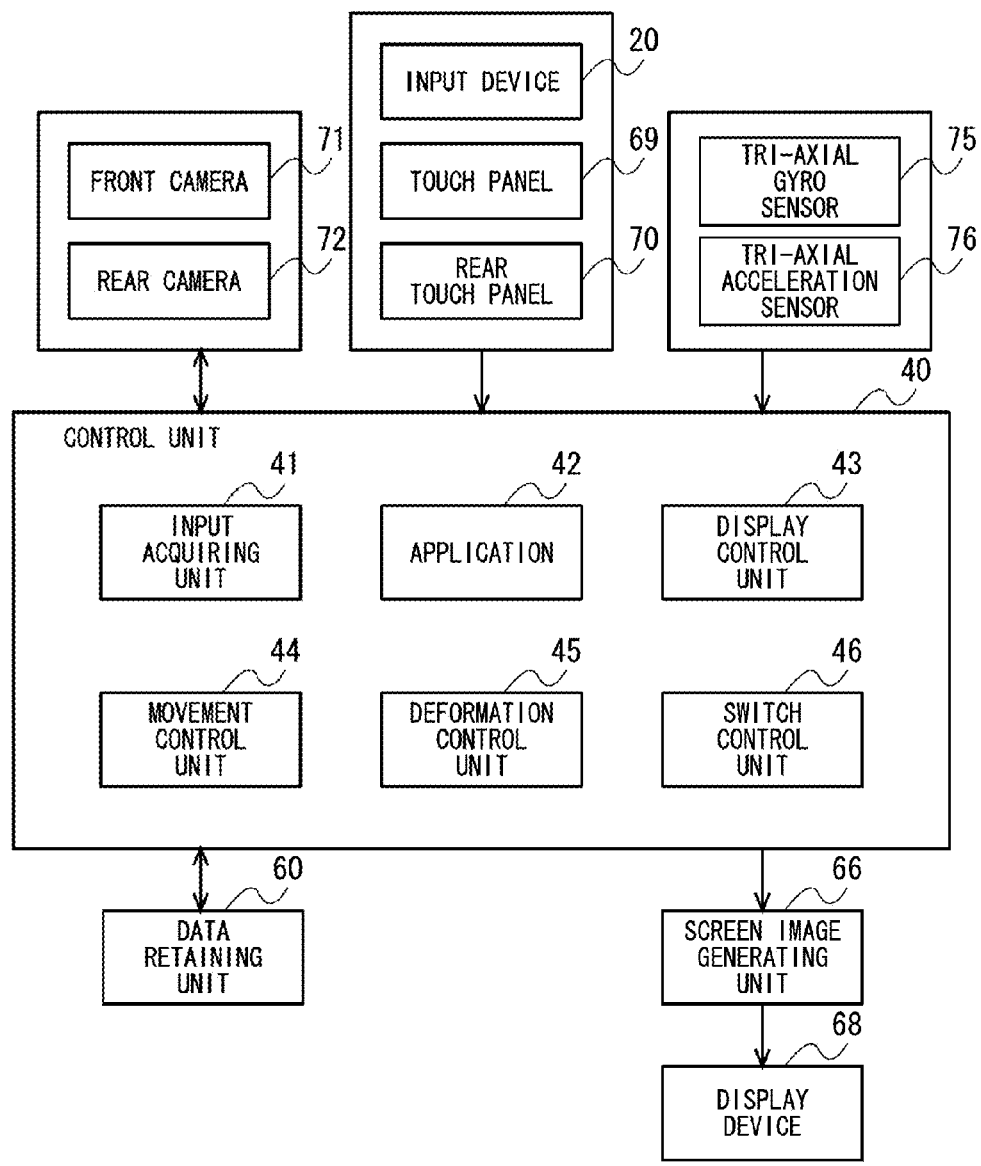
FIG. 3 shows a structure of the game device according to the exemplary embodiment.

FIG. 3 shows the structure of the game device 10 according to an exemplary embodiment. The game device 10 comprises the input device 20, a control unit 40, a data retaining unit 60, a screen image generating unit 66, a display device 68, the touch panel 69, the rear touch panel 70, the front camera 71, the rear camera 72, a tri-axial gyro sensor 75, and a tri-axial acceleration sensor 76. Those elements are implemented by a CPU of a computer, memory, a program loaded into the memory, or the like in terms of hardware components. FIG. 3 depicts functional blocks implemented by cooperation of these components. Therefore, it will be obvious to those skilled in the art that the functional blocks may be implemented in a variety of ways, by hardware only, software only, or a combination thereof.

The touch panel 69 may be any type of touch panel, such as, matrix switch type, resistance film type, surface acoustic wave type, infrared type, electromagnetic induction type, electrical capacitance type, or the like. The touch panel 69 outputs coordinates of positions where input is detected at predetermined time intervals.

The rear touch panel 70 may also be any type of touch panel. The rear touch panel 70 may comprise a pressure sensitive sensor that is capable to detect the pressure of a pressing force on the rear touch panel 70. Alternatively, the rear touch panel 70 may calculate the strength of input on the basis of an area where the input is detected, a voltage value, an electric capacitance, or the like. The rear touch panel 70 outputs coordinates of positions where input is detected and the strength of the input (pressure) at predetermined time intervals.

The front camera 71 takes an image of the front side of the game device 10. The rear camera 72 takes an image of the backside of the game device 10.

The tri-axial gyro sensor 75 detects an angular speed in each of the XZ plane, ZY plane, and YX plane of the game device 10. The tri-axial gyro sensor 75 may be a mechanical gyro sensor such as a rotor gyro or a vibration gyro, or may be a fluidic gyro sensor or an optical gyro sensor. By integrating the angular speed around each of the three axes detected by the tri-axial gyro sensor 75, a rotation amount around each of the three axes can be calculated.

The tri-axial acceleration sensor 76 incorporates a mass supported by a beam. By detecting the change of the position of the mass caused by acceleration, the tri-axial acceleration sensor 76 detects the acceleration of the game device 10 in each of the three-axis direction, X, Y, and Z. The tri-axial acceleration sensor 76 may be a mechanical, optical, or semiconductor acceleration sensor. By using the tri-axial acceleration sensor 76, the relative angle between each of the three axes X, Y and Z of the game device 10 and the direction of the gravitational acceleration can be detected, which enables the calculation of the attitude of the game device 10. By integrating the acceleration of each of the three axes, velocities can be calculated, and by further integrating, the distance of movement can be calculated.

The control unit 40 reads out a program of an application, such as a game or the like, from a data retaining unit 60 or the like that stores the program, executes the program on the basis of operational input by a player. The data retaining unit 60 retains a program, various data files, or the like. The screen image generating unit 66 generates a screen image of an application or the like that is controlled by the control unit 40 and allows the display device 68 to display the screen image.

The control unit 40 comprises an input acquiring unit 41, an application 42, a display control unit 43, a movement control unit 44, a deformation control unit 45, and a switch control unit 46.

The input acquiring unit 41 acquires the coordinates of the position of detected input from the touch panel 69 and the rear touch panel 70. The input acquiring unit 41 may acquire information detected by the touch panel 69 and the rear touch panel 70 and may determine whether or not the detected input correspond to input for indicating direction, such as, flick input, swipe input, drag input, pinch input, or the like. Alternatively, a device driver (not shown) or the like may determine whether or not the detected input correspond to flick input, swipe input, drag input, pinch input, or the like, and the input acquiring unit 41 may acquire the result of determination from the device driver or the like. Generally, drag input is a manipulation where after a finger or a thumb touches a touch panel, the finger or the thumb is moved without detaching from the panel, swipe input is a manipulation where after a finger or a thumb touches a touch panel, the finger or the thumb is moved in a specific direction without detaching from the panel, and flick input is a manipulation where after a finger or a thumb touches a touch panel, the finger or the thumb is moved at or more than a predetermined value of speed and is released just the way as it goes. According to functions that will be explained below, an input direction can be acquired from any one type of the operational input, such as flick input, swipe input, drag input, pinch input, or the like. Thus, the types of the operational input are not particularly distinguished, but such operational input is referred to as "input for indication a direction." As a matter of course, a function may be assigned to limited one type of the operational input when implementing. The application 42 executes a program such as a game or the like, and provides various functions. The display control unit 43 controls displaying of a display screen image generated by the application 42.

The movement control unit 44 controls the movement of display targets such as an icon, a listed item, or the like displayed on a display screen of the display device. The deformation control unit 45 controls the deformation of a display target that is displayed on the display screen. The switch control unit 46 controls a switch of display targets that are displayed on the display screen. The detail on these functions will be described later with reference to exemplary screen images.

(Movement Control of a Display Target)

First, an explanation will be given on a technology for controlling the movement of a display target. The game device 10 according to the exemplary embodiment provides a user interface that specifies a display target, which is a target to be moved, by a first input entry and scrolls one or more display targets other than the target to be moved by a second input entry, which enables the target to be moved to move relative to the display targets other than the target to be moved.

Figure 4:
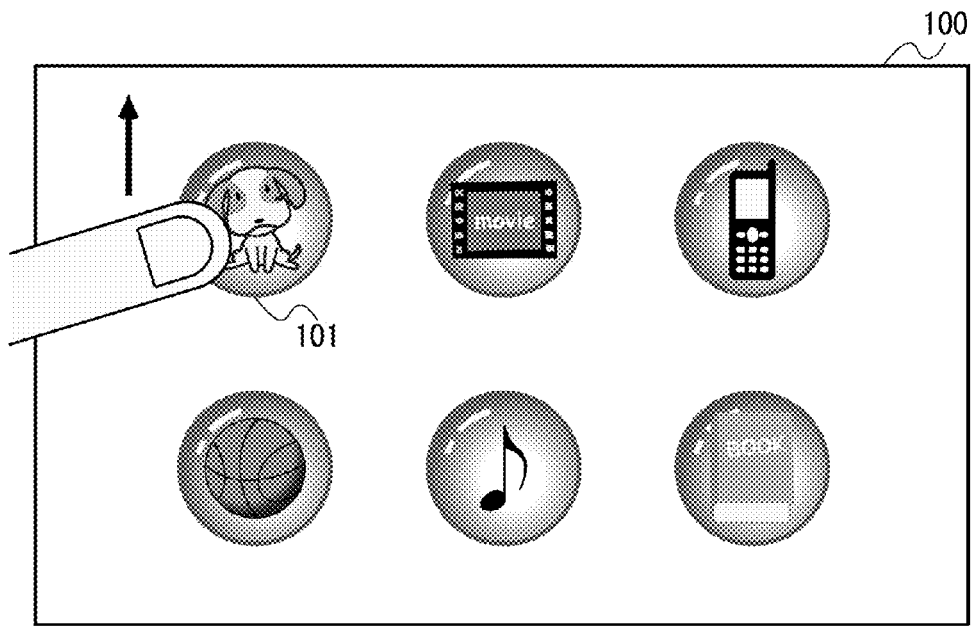
FIG. 4 shows an exemplary screen image that a display control unit displays on a display device.

FIG. 4 shows an exemplary screen image that the display control unit displays on the display device. The application 42 that presents a menu generates a menu screen image 100 where a plurality of icons are disposed. The icons correspond to an application that can be executed in the game device 10, or a data file or a folder stored in the game device 10. The display control unit 43 controls displaying of the menu screen image 100. If there are a lot of icons to be displayed, the display control unit 43 allows the menu screen image 100 to be divided into a plurality of pages and to be displayed. The movement control unit 44 controls scrolling of pages when an icon is moved between pages of the menu screen image 100.

According to a prior art, in case of moving an icon 101 to another page, a user drags the icon 101 and moves the icon to the edge of a menu screen. Accordingly, a page is scrolled in the opposite direction so that an adjacent page appears on the display screen image from the edge. For example, if the icon 101 is dragged in the up direction in FIG. 4, the page is scrolled in the down direction so that a page disposed at a position upper than the display screen image appears. However, such a manipulation method may cause a problem where a result not intended by a user arises. For example, the scrolling is finished in case that the user moves his/her finger or thumb too far so that the icon is dragged to the outside of the touch panel and the device determines that the finger or thumb is detached because input can not be detected. Conversely, the speed of scrolling may become larger than the expectation so that pages may be scrolled too far.

Figure 5:
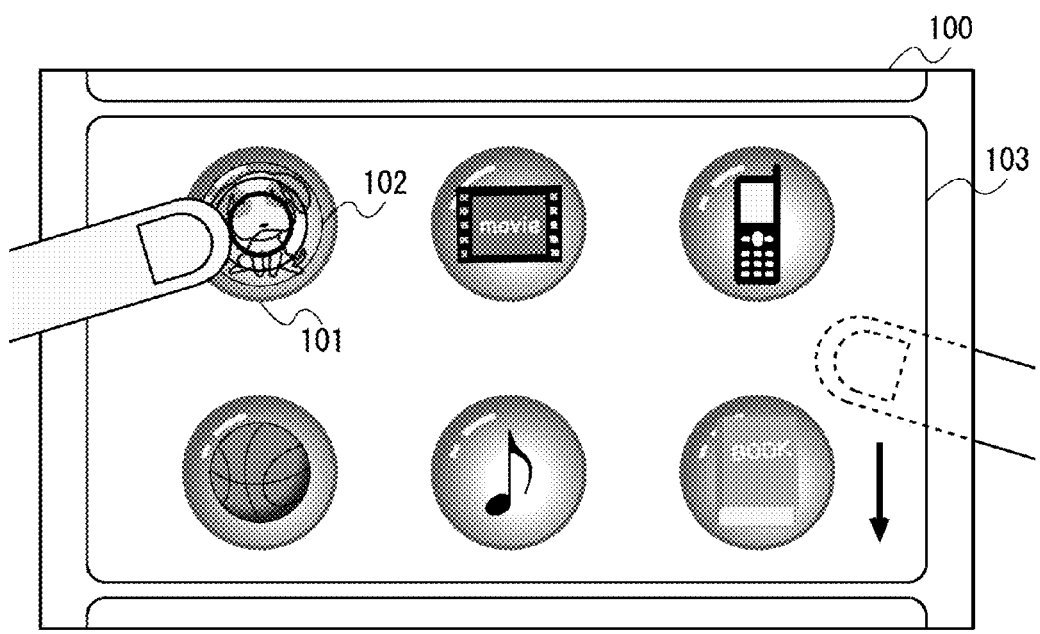
FIG. 5 shows an exemplary screen image that the display control unit displays on the display device.

FIG. 5 shows an exemplary screen image that the display control unit displays on the display device. In the example shown in FIG. 5, if the input acquiring unit 41 acknowledges, as a first input entry, tap input continuing more than or equal to a predetermined time period on the touch panel 69 at a position corresponding to a position where one of the icons is displayed on the menu screen image 100, the movement control unit 44 defines, as a target to be moved, the icon 101 displayed at a position corresponding to the position of the first input entry, and switches a mode to a movement mode. In this process, the display control unit 43 changes the display mode of the selected icon 101 to a display mode different from a display mode that has been used. In the example shown in FIG. 5, the graphic symbol 102 is displayed so as to overlap with the icon 101. In addition, the display control unit 43 displays a graphic symbol that indicates a page of the menu screen image 100 so that a user can visually recognize that the mode is changed to a mode where the icon 101 is moved between pages. In the example shown in FIG. 5, the graphic symbol 103 is displayed around icons included in the first page.

If the input acquiring unit 41 acknowledges, as a second input entry, input for indicating a vertical direction on the rear touch panel 70, the movement control unit 44 allows one or more display targets other than the icon 101 in the direction of the input for indicating direction to scroll while keeping the position for displaying the icon 101, which is selected as the target to be moved, at the position of the first input entry (i.e., the position of a finger or a thumb of the user contacting the touch panel 69).

Figure 6:
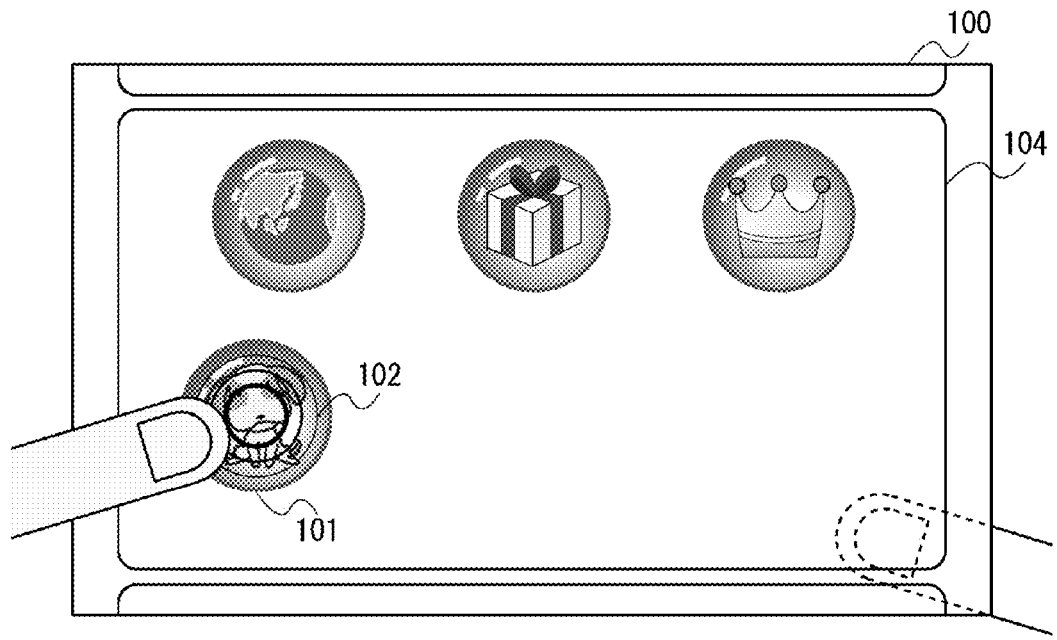
FIG. 6 shows an exemplary screen image that the display control unit displays on the display device.

FIG. 6 shows an exemplary screen image that the display control unit displays on the display device. In the menu screen image 100 shown in FIG. 5, if the input acquiring unit 41 acquires input for indicating vertical direction on the rear touch panel 70, the movement control unit 44 calculates a distance between a position where the input for indicating direction is started and a current position of the input, and in accordance with the calculated distance, determines an amount of scrolling. The movement control unit 44 may determine the amount of scrolling in accordance with the vertical component of the calculated distance. In the example shown in FIG. 5, one page scrolling can be made by one input entry for indicating direction. The movement control unit 44 allows one or more display targets to scroll for one page if the distance of the input for indicating direction is longer than a predetermined threshold value, and does not allow the display targets to scroll and returns the page that has been displayed if the distance is shorter than the threshold value.

If the input acquiring unit 41 acquires input for indicating down direction on the rear touch panel 70 during the movement mode as shown in FIG. 5, the movement control unit 44 allows the menu screen image 100 to scroll for one page if the distance of the input for indicating direction is longer enough, as shown in FIG. 6. If the user moves the finger or thumb of his/her left hand (i.e., if the position of the first input entry is moved), the movement control unit 44 moves the icon 101 in the display screen image in accordance with the movement of the finger or thumb. This allows the user to move the icon 101 relatively to one or more other display targets. If the user detaches the finger or thumb from the touch panel 69, the movement control unit 44 finishes the movement mode and switches the mode to a normal mode, removes the graphic symbol 102 and the graphic symbol 103 from the screen image and moves the icon 101, which has been defined as a target to be moved, to a position where the finger or thumb is detached in a page that is currently displayed.

In this manner, a user can, for example, select a target to be moved by a finger or thumb of one hand, and can scroll a page by a finger or thumb of the other hand. This allows the user to readily move a target to be moved such as the icon 101 or the like to another page. Further, the likelihood of the occurrence of a malfunction can be reduced.

Figure 7:
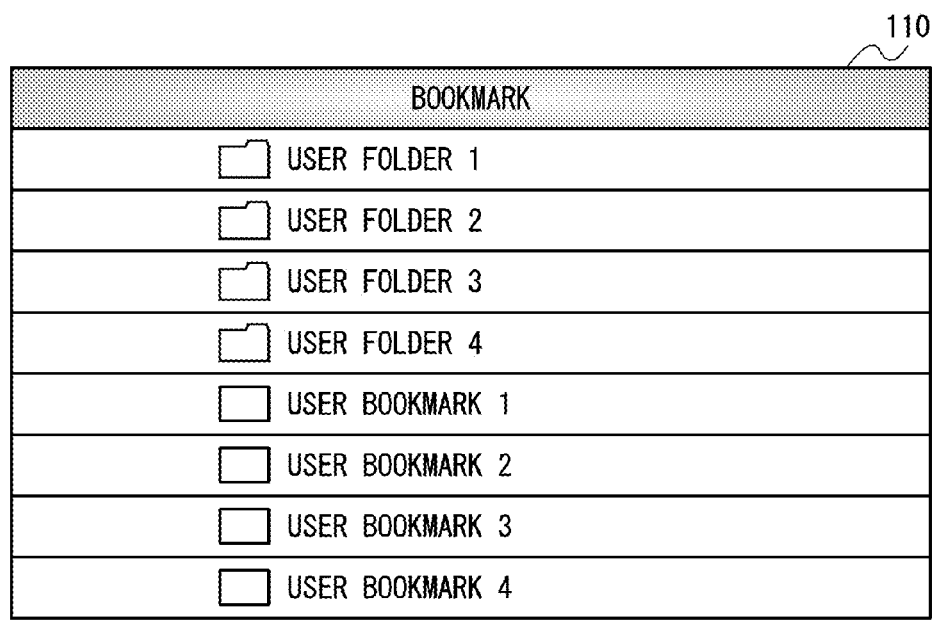
FIG. 7 shows an exemplary screen image that the display control unit displays on the display device.

FIG. 7 shows an exemplary screen image that the display control unit displays on the display device. In the example shown in FIG. 7, a list of a plurality of bookmark folders and a plurality of bookmarks are displayed on a bookmark screen image 110. In case there are a lot of items that should be displayed, the display control unit 43 displays the bookmark screen image 110 so as to be able to scroll. The movement control unit 44 controls scrolling of the bookmark screen image 110.

Figure 8:
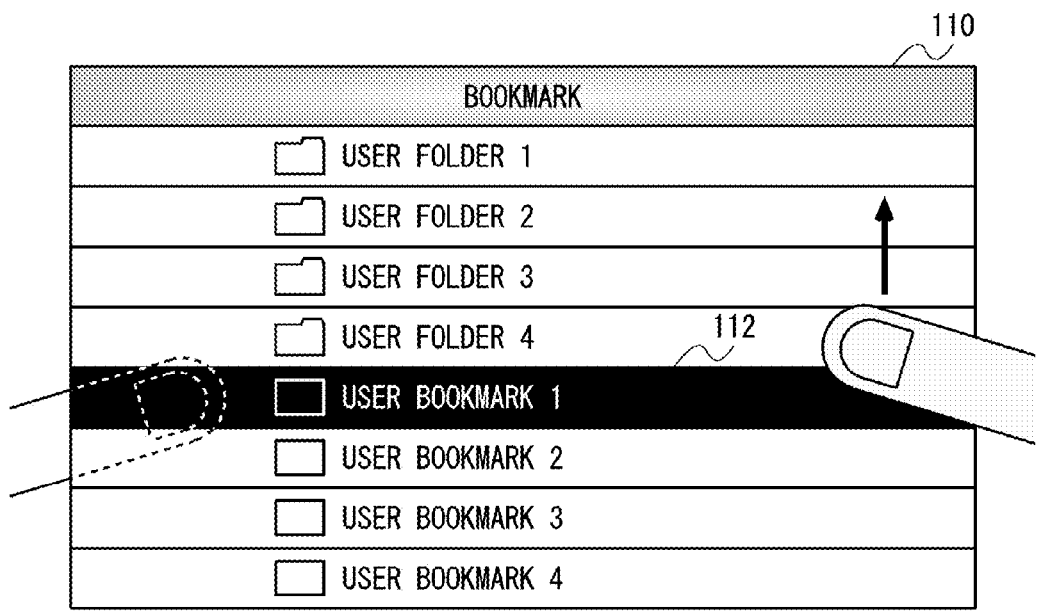
FIG. 8 shows an exemplary screen image that the display control unit displays on the display device.

FIG. 8 shows an exemplary screen image that the display control unit displays on the display device. In the example shown in FIG. 8, if the input acquiring unit 41 acknowledges, as a first input entry, tap input continuing more than or equal to a predetermined time period on the rear touch panel 70 at a position corresponding to a position where one of the items is displayed on the bookmark screen image 110, the movement control unit 44 defines, as a target to be moved, the item 112 displayed at a position corresponding to the position of the first input entry, and switches a mode to a movement mode. In this process, the display control unit 43 changes the display mode of the selected item 112 to a display mode different from a display mode that has been used. In the example shown in FIG. 8, item 112 is displayed in inverted black and white. The display control unit 43 may display an item selected as a target to be moved in a display mode wherein the item appears as if it is pressed down and sinks, or may display the item in a display mode wherein the item appears as if it is pushed up and lifted. In case that the first input entry is made on the touch panel 69, the display control unit 43 may display the target to be moved as if it is pressed down. Meanwhile, in case that the first input entry is made on the rear touch panel 70, the display control unit 43 may display the target to be moved as if it is pushed up. This can provide a user with an environment for operation that can be easily understood intuitively.

Figure 9:
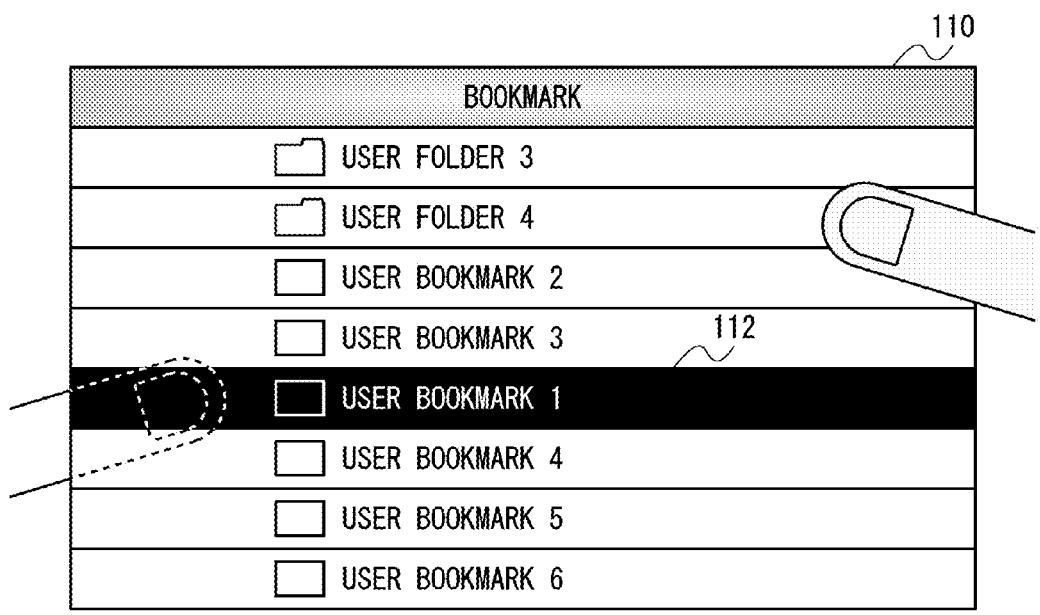
FIG. 9 shows an exemplary screen image that the display control unit displays on the display device.

FIG. 9 shows an exemplary screen image that the display control unit displays on the display device. In the bookmark screen image 110 shown in FIG. 8, if the input acquiring unit 41 acquires input for indicating a vertical direction on the touch panel 69, the movement control unit 44 calculates a distance between a position where the input for indicating direction is started and a current position of the input, and in accordance with the calculated distance, determines an amount of scrolling. The movement control unit 44 may determine the amount of scrolling in accordance with the vertical component of the calculated distance.

If the input acquiring unit 41 acquires input for indicating up direction on the touch panel 69 during the movement mode as shown in FIG. 8, the movement control unit 44 allows the bookmark screen image 110 to scroll in the up direction as shown in FIG. 9. This allows the user to move the item 112 relatively to other items. If the user detaches the finger or thumb from the rear touch panel 70, the movement control unit 44 finishes the movement mode and switches to a normal mode, displays the item 112 in the original display mode by inverting black and white again, and moves the item 112, which has been defined as a target to be moved, to a position where the item 112 is currently displayed.

The movement control unit 44 may acknowledge, as the first input entry, tap input on the touch panel 69 or on the rear touch panel 70, long push input with which a user taps and holds for or more than a predetermined time period, concurrent tap input at same positions or positions within a predetermined rage on the touch panel 69 and on the rear touch panel 70, click input by a pointing device such as a mouth or the like, etc, and may define a display target displayed at the position of the first input entry as the target to be moved.

The movement control unit 44 changes a mode to a movement mode triggered by the first input entry, or may change a mode to the movement mode by input on a predetermined button, a selection of a menu, or the like. The movement control unit 44 feeds back visually that the mode is changed to the movement mode by changing a display mode by displaying a graphic symbol or the like on a target to be moved. This allows a user to notice even in case that the mode is changed to the movement mode by an unintended operation. Thus, the likelihood of the occurrence of a malfunction can be reduced.

During the movement mode, the movement control unit 44 acknowledges the second input entry as an instruction for moving a display target other than the target to be moved. As the second input entry, the movement control unit 44 may acknowledge flick input, swipe input, drag input, pinch input, or double tap input on the touch panel 69 or on the rear touch panel 70, input on a predetermined button 22, a directional key 21, analogue stick 23, 24, or the like, the change in the attitude of the game device 10 detected by the tri-axial gyro sensor 75, the tri-axial acceleration sensor 76, or the like, and may determine the amount of scrolling or the like in accordance with the second input entry. In case of flick input, swipe input, drag input, pinch input, or the like, the amount of scrolling may be determined in accordance with the input position, the moving speed, the moving distance, the moving time, or the like. In case of double tap input, button input, or the like, the amount of scrolling may be determined in accordance with the number of times of input, the time of input, the pressure of input, or the like.

Figure 10:
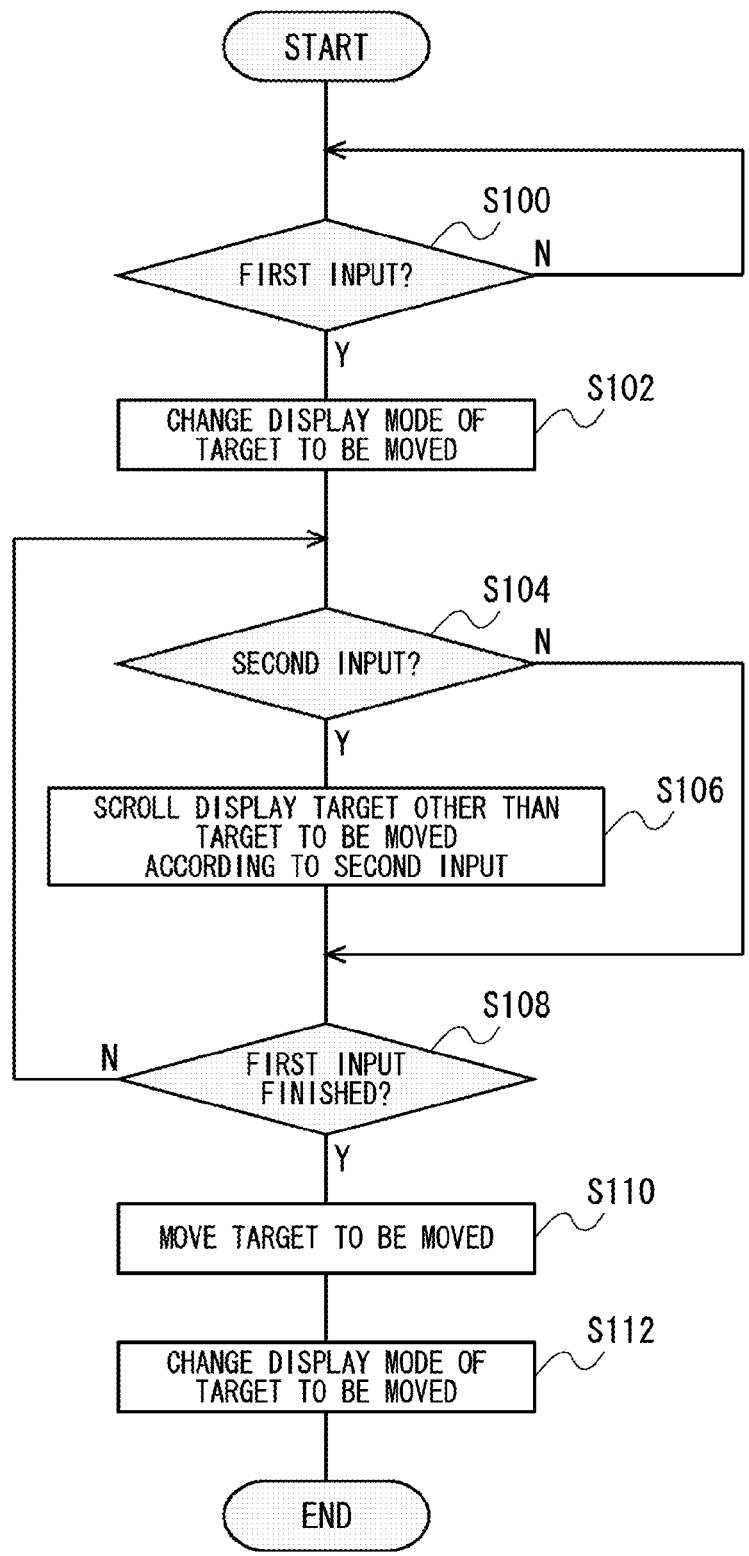
FIG. 10 shows a flowchart indicating a procedure of an input control method according to an exemplary embodiment.

FIG. 10 shows a flowchart indicating a procedure of an input control method according to the exemplary embodiment. The flowchart shown in FIG. 10 indicates a procedure of controlling the movement of a target to be moved. The movement control unit 44 waits until the input acquiring unit 41 acquires the first input entry on the touch panel 69 and/or the rear touch panel 70 (N in S100). If the input acquiring unit 41 acquires the first input entry (Y in S100), the movement control unit 44 defines a display target displayed on the input position as the target to be moved, changes the mode to a movement mode, and changes the display mode of the display target (S102). If the input acquiring unit 41 acquires the second input entry on the touch panel 69 and/or the rear touch panel 70 (Y in S104), the movement control unit 44 scrolls one or more display targets other than the target to be moved in the direction determined in accordance with the direction of the second input entry (S106). If the second input entry is not acquired (N in S104), the step S106 will be skipped. Until the first input entry is finished for example when a user detaches the finger or thumb from the touch panel 69 (N in S108), the procedure returns to step S104 and the movement mode continues. If the first input entry is finished (Y in S108), the movement control unit 44 moves an item, which is the target to be moved, to a position where the item is currently displayed, and updates as necessary a table or the like for managing information on a list stored in the data retaining unit 60 or the like (S110). The movement control unit 44 finishes the movement mode and changes the mode back the display mode of an icon, an item or the like that have been defined as the target to be displayed (S112).

According to the example described above, an example where the first input entry is acquired from the touch panel 69 and the second input entry is acquired from the rear touch panel 70, and an example where the first input entry is acquired from the rear touch panel 70 and the second input entry is acquired from the touch panel 69 are presented. According to another example, both of the first input entry and the second input entry may be acquired from the touch panel 69, or from the rear touch panel 70.

(Deformation Control of a Display Target)

Subsequently, an explanation will be given on a technology for controlling the deformation of a display target. The game device 10 according to the exemplary embodiment provides a user interface that can specify by a first input entry a center position of deformation as a constrained point that is not moved by a deformation, and can specify by a second input entry the degree of deformation.

Figure 11:
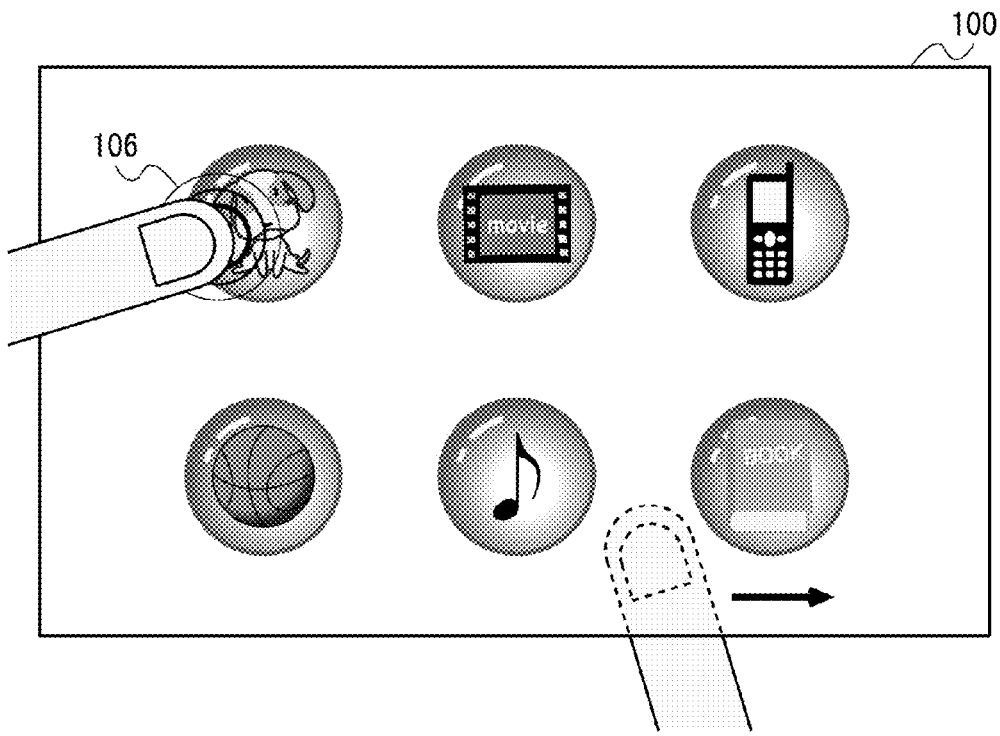
FIG. 11 shows an exemplary screen image that the display control unit displays on the display device.

FIG. 11 shows an exemplary screen image that the display control unit displays on the display device. In the example shown in FIG. 11, if the input acquiring unit 41 acknowledges, as a first input entry, tap input continuing more than or equal to a predetermined time period on the touch panel 69 on the menu screen image 100, the deformation control unit 45 defines the position of the first input entry as the center position of deformation, and switches a mode to a deformation mode. In this process, the display control unit 43 displays a graphic symbol 106 at the center position in order to allow a user to visually discriminate the center position. During the deformation mode, if the input acquiring unit 41 acknowledges, as a second input entry, input for indicating direction on the rear touch panel 70, the deformation control unit 45 enlarges or reduces one or more display targets displayed on the menu screen image 100 while fixing the center position as the center of the deformation.

Figure 12:
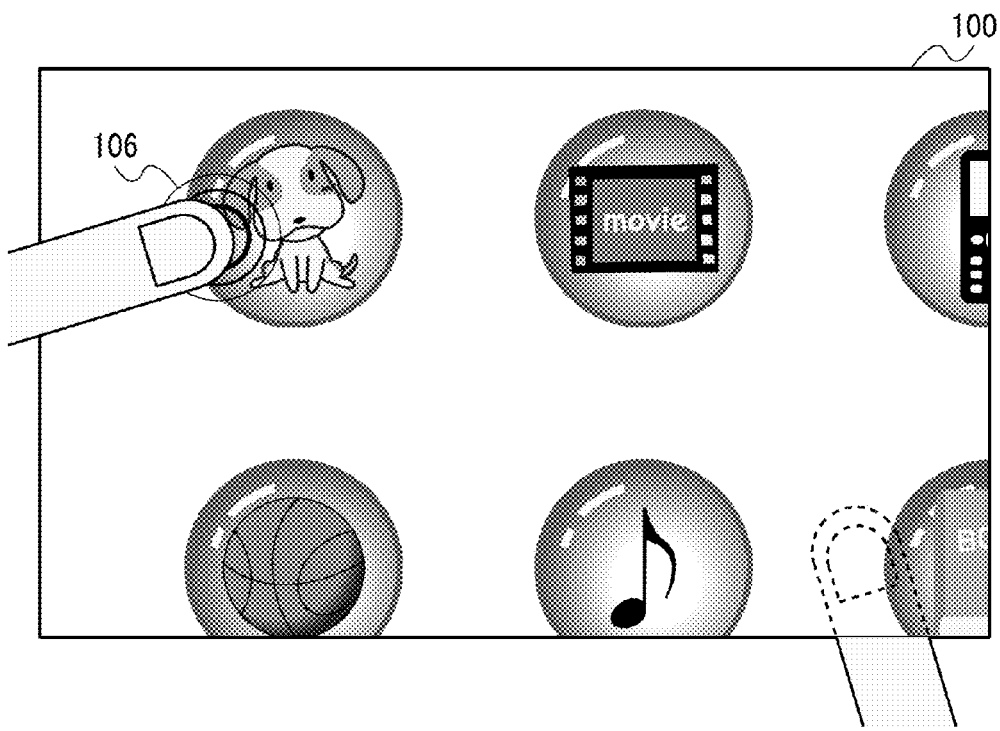
FIG. 12 shows an exemplary screen image that the display control unit displays on the display device.

FIG. 12 shows an exemplary screen image that the display control unit displays on the display device. In the example shown in FIG. 11, input for indicating right direction on the rear touch panel 70 is allocated to the enlargement of a display target and input for indicating left direction is allocated to the reduction of a display target. In the menu screen image 100 shown in FIG. 11, if the input acquiring unit 41 acquires input for indicating direction on the rear touch panel 70, the deformation control unit 45 calculates a distance between a position where the input for indicating direction is started and a current position of the input, and in accordance with the calculated distance, determines a magnification ratio when enlarging or reducing the one or more display targets. If the input acquiring unit 41 acquires input for indicating right direction on the rear touch panel 70 during the deformation mode as shown in FIG. 11, the deformation control unit 45 enlarges the one or more display targets in the magnification ratio according to the input for indicating direction while fixing the center position as shown in FIG. 12. If the user detaches the finger or thumb from the touch panel 69, the deformation control unit 45 finishes the deformation mode and switches the mode to a normal mode, and removes the graphic symbol 106 from the screen image. In this example, input for indicating direction of leaving the center position specified by the first input entry is allocated to the enlargement of a display target and input for indicating direction of approaching the center position is allocated to the reduction of a display target. In another example, input for indicating direction of approaching the center position may be allocated to the enlargement and input for indicating direction of leaving to the center position may be allocated to the reduction, conversely. Alternatively, a direction of the input for indicating direction and an instruction for enlarging or reducing may be associated with each other without reference to the distance from the center position. For example, in the example shown in FIG. 12, input for indicating up direction may be allocated to the enlargement, and input for indicating down direction may be allocated to the reduction.

Figure 13:
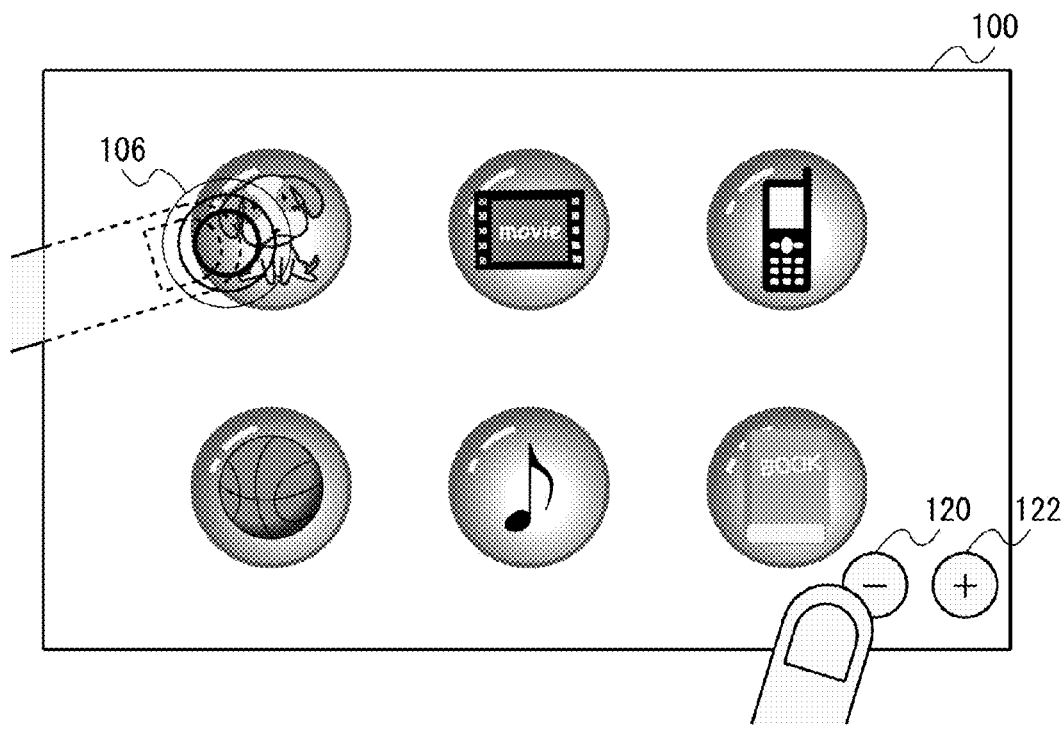
FIG. 13 shows an exemplary screen image that the display control unit displays on the display device.

FIG. 13 shows an exemplary screen image that the display control unit displays on the display device. In the example shown in FIG. 13, if the input acquiring unit 41 acknowledges, as a first input entry, tap input continuing more than or equal to a predetermined time period on the rear touch panel 70 on the menu screen image 100, the deformation control unit 45 defines the position of the first input entry as the center position of deformation, and switches a mode to a deformation mode. In this process, the display control unit 43 displays a graphic symbol 106 at the center position in order to allow a user to visually discriminate the center position. In addition, the display control unit 43 displays a reduction button 120 for reducing one or more display targets and an enlargement button 122 for enlarging one or more display targets on the menu screen image 100. During the deformation mode, if the input acquiring unit 41 acknowledges, as a second input entry, tap input at a position corresponding to the reduction button 120 or the enlargement button 122, the deformation control unit 45 enlarges or reduces a display target displayed on the menu screen image 100 while fixing the center position as the center of the deformation.

Figure 14:
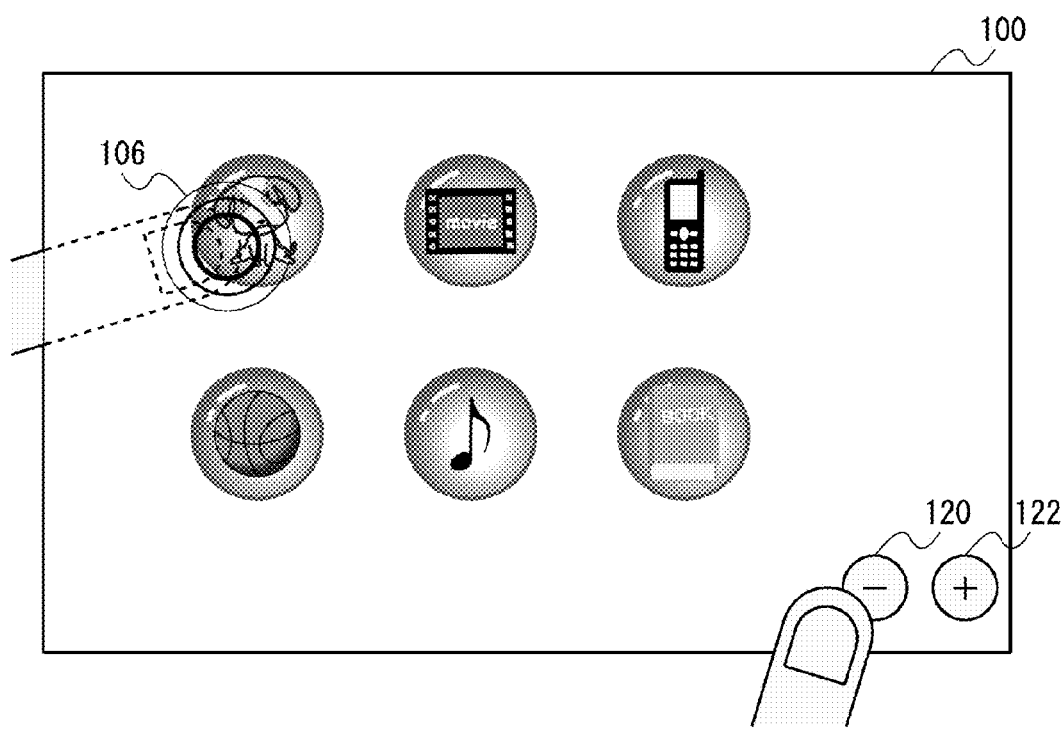
FIG. 14 shows an exemplary screen image that the display control unit displays on the display device.

FIG. 14 shows an exemplary screen image that the display control unit displays on the display device. In the menu screen image 100 shown in FIG. 13, if the input acquiring unit 41 acquires tap input at a position corresponding to the reduction button 120 or the enlargement button 122 on the touch panel 69, the deformation control unit 45 determines a magnification ratio when enlarging or reducing one or more display targets in accordance with the number of times of tap input or the time of tap input. As shown in FIG. 13, if the input acquiring unit 41 acquires tap input at a position corresponding to the reduction button 120 on the touch panel 69 during the deformation mode, the deformation control unit 45 reduces the display target in the magnification ratio according to the tap input on the reduction button 120 while fixing the center position as shown in FIG. 14. If the user detaches the finger or thumb from the rear touch panel 70, the deformation control unit 45 finishes the deformation mode and switches the mode to a normal mode, and removes the graphic symbol 106 from the screen image.

Figure 15:
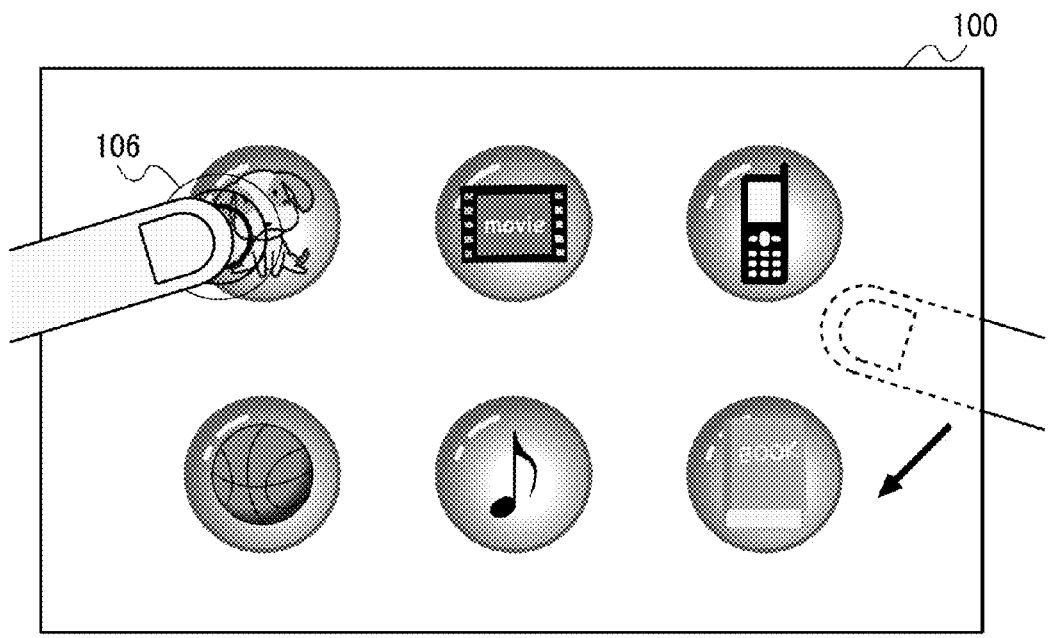
FIG. 15 shows an exemplary screen image that the display control unit displays on the display device.

FIG. 15 shows an exemplary screen image that the display control unit displays on the display device. In the example shown in FIG. 15, if the input acquiring unit 41 acknowledges, as a first input entry, tap input continuing more than or equal to a predetermined time period on the touch panel 69 on the menu screen image 100, the deformation control unit 45 defines the position of the first input entry as the center position of deformation, and switches a mode to a deformation mode. In this process, the display control unit 43 displays a graphic symbol 106 at the center position in order to allow a user to visually discriminate the center position. During the deformation mode, if the input acquiring unit 41 acknowledges, as a second input entry, input for indicating direction on the rear touch panel 70, the deformation control unit 45 rotates one or more display targets displayed on the menu screen image 100 while setting the center position as the center of the rotation.

Figure 16:
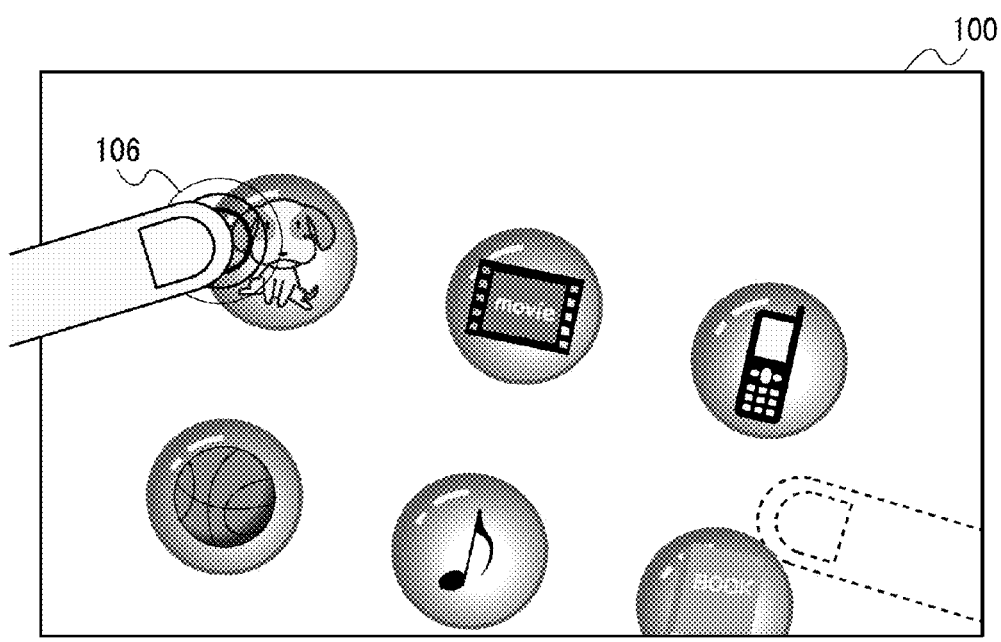
FIG. 16 shows an exemplary screen image that the display control unit displays on the display device.

FIG. 16 shows an exemplary screen image that the display control unit displays on the display device. In the menu screen image 100 shown in FIG. 15, if the input acquiring unit 41 acquires input for indicating right direction on the rear touch panel 70, the deformation control unit 45 calculates an angle defined by a straight line connecting a position where the input for indicating direction is started and the center position and a straight line connecting a current position of the input for indicating direction and the center position. The deformation control unit 45 defines the calculated angle as an angle of rotation when rotating the one or more display targets. If the input acquiring unit 41 acquires input for indicating lower left direction on the rear touch panel 70 during the deformation mode as shown in FIG. 15, the deformation control unit 45 rotates the one or more display targets by the angle of rotation according to the input for indicating direction while setting the center position as the center of rotation as shown in FIG. 16. If the user detaches the finger or thumb from the touch panel 69, the deformation control unit 45 finishes the deformation mode and switches the mode to a normal mode, and removes the graphic symbol 106 from the screen image.

The deformation control unit 45 may acknowledge, as the first input entry, tap input on the touch panel 69 or on the rear touch panel 70, long push input with which a user taps and holds for or more than a predetermined time period, concurrent tap input entries at same positions or positions within a predetermined rage on the touch panel 69 and on the rear touch panel 70, click input by a pointing device such as a mouth or the like, etc, and may define a position of the first input entry as the center position.

The deformation control unit 45 changes a mode to a deformation mode triggered by the first input entry, or may be change a mode to the deformation mode by input on a predetermined button, a selection of a menu, or the like. The deformation control unit 45 feeds back visually that the mode is changed to the deformation mode by changing a display mode for example by displaying a graphic symbol or the like on the center position. This allows a user to notice even in case that the mode is changed to the deformation mode by an unintended operation. Thus, the occurrence of a malfunction can be prevented.

During the deformation mode, the deformation control unit 45 acknowledges the second input entry as an instruction for deforming one or more display targets. As the second input entry, the deformation control unit 45 may acknowledge flick input, swipe input, drag input, pinch input, or double tap input on the touch panel 69 or on the rear touch panel 70, input on a predetermined button 22, a directional key 21, left analogue stick 23, or the right analogue stick 24, or the like, the change in the attitude of the game device 10 detected by the tri-axial gyro sensor 75, the tri-axial acceleration sensor 76, or the like, and may determine the magnification of enlargement or reduction, the angle of rotation, or the like in accordance with the second input entry. In case of flick input, swipe input, drag input, pinch input, or the like, the magnification or the angle of rotation may be determined in accordance with the input position, the moving speed, the moving distance, the moving time, or the like. In case of double tap input, button input, or the like, the magnification or the angle may be determined in accordance with the number of times of input, the time of input, the pressure of input, or the like.

In case that long push input on the touch panel 69 or on the rear touch panel 70 is allocated to the first input entry, the deformation control unit 45 may, if the position of the first input entry is moved during a deformation mode, move the center position in accordance with the movement, or may not move the center position from an initial center position. In the former case, a user can deform and scroll one or more display targets at the same time. For example, a user can enlarge a display target while setting a position near the edge of a display screen image as the center of the deformation, and can scroll the display screen image so that the center of the deformation comes to the center of the screen image, simultaneously.

In case that drag input on the touch panel 69 or on the rear touch panel 70 are allocated to the second input entry, the deformation control unit 45 may control the enlargement/reduction and the rotation of one or more display targets concurrently. For example, an angle defined by a straight line connecting a position where drag input is started and the center position of deformation, and a straight line connecting a current position of the drag input and the center position of deformation may be defined as a rotation angle. In addition, a ratio of the distance between a position where drag input is started and the center position of deformation, and the distance between a current position of the drag input and the center position of deformation may be defined as the magnification ratio of enlargement or reduction.

Conventionally, the center position can not be specified in case a display target is deformed by using a button 22, a directional key 21, the left analogue stick 23, the right analogue stick 24, or the like. Further, it is difficult to deform a display target while setting a position near the edge of a display screen image as the center of the deformation in case that the display target is deformed by pinch input or the like on a touch panel. By contrast, according to a technology of the embodiment, while specifying a center of the deformation on a display screen image, the degree of deformation can be specified by another input for instruction. Thus user friendliness can be improved.

Figure 17:
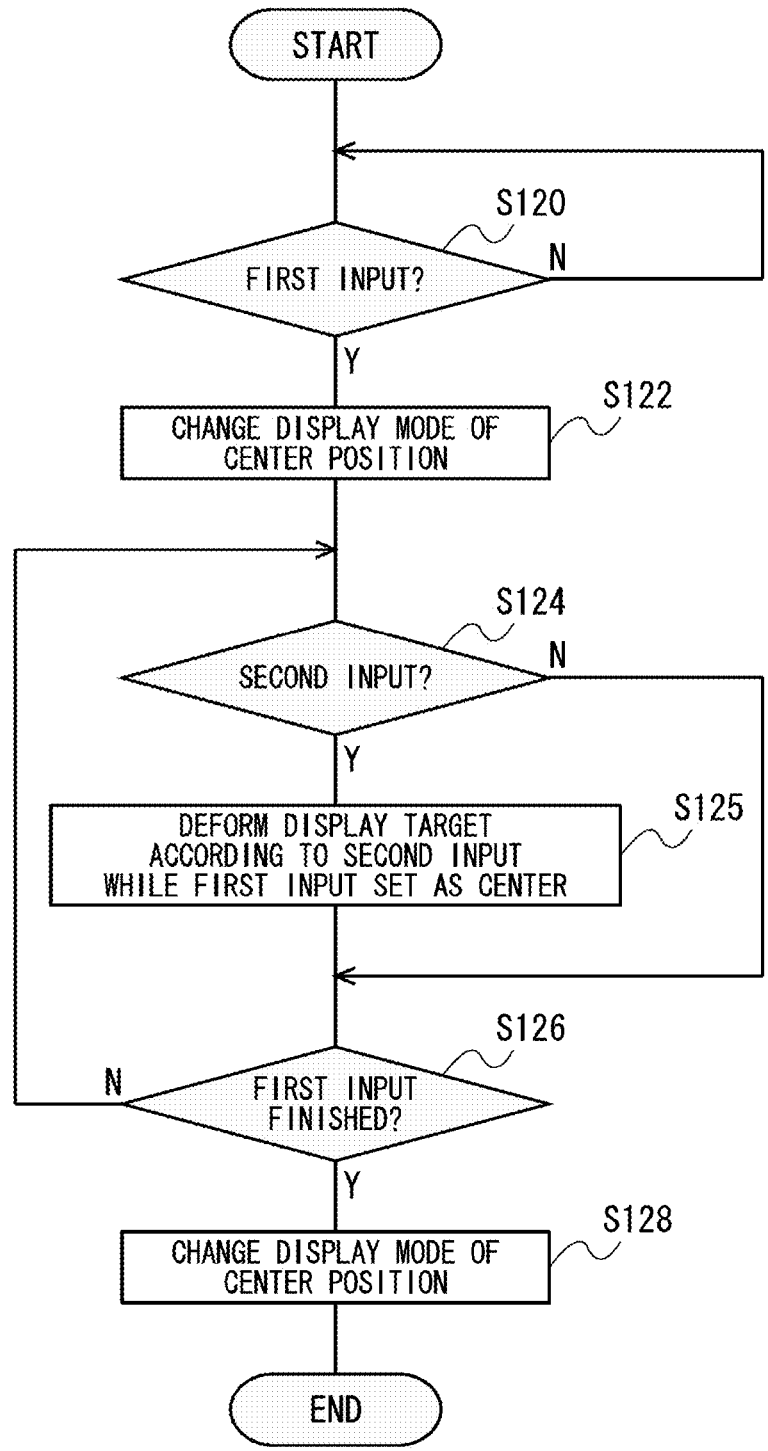
FIG. 17 shows a flowchart indicating a procedure of an input control method according to an exemplary embodiment.

FIG. 17 shows a flowchart indicating a procedure of an input control method according to the exemplary embodiment. The flowchart shown in FIG. 17 indicates a procedure of controlling the deformation of one or more display targets. The deformation control unit 45 waits until the input acquiring unit 41 acquires the first input entry on the touch panel 69 and/or the rear touch panel 70 (N in S120). If the input acquiring unit 41 acquires the first input entry (Y in S120), the deformation control unit 45 defines the position of the first input entry as the center position, changes the mode to a movement mode, and changes the display mode by displaying a graphic symbol at the center position, etc (S122). If the input acquiring unit 41 acquires the second input entry on the touch panel 69 and/or the rear touch panel 70 (Y in S124), the deformation control unit 45 allows one or more display targets to deform with magnification ratio and an angle determined in accordance with the second input entry while setting the center position as the center of the deformation (S125). If the second input entry is not acquired (N in S124), the step S125 will be skipped. Until the first input entry is finished for example when a user detaches the finger or thumb from the touch panel 69 and/or from the rear touch panel 70 (N in S126), the procedure returns to step S124 and the deformation mode continues. If the first input entry is finished (Y in S126), the deformation control unit 45 finishes the deformation mode, and changes back the display mode to the original mode by removing a symbol displayed at the center position from the display screen image (S128).

According to the example described above, an example where the first input entry is acquired from the touch panel 69 and the second input entry is acquired from the rear touch panel 70, and an example where the first input entry is acquired from the rear touch panel 70 and the second input entry is acquired from the touch panel 69 are presented. According to another example, both of the first input entry and the second input entry may be acquired from the touch panel 69, or from the rear touch panel 70.

(Switch Control of Display Targets)

Subsequently, an explanation will be given on a technology for controlling the switch of display targets. According to the exemplary embodiment, different operational input is allocated to a switch in an upper layer and to a switch in a lower layer in case that display targets are hierarchized into a plurality of layers. Examples of the upper layer and the lower layer includes: when displaying a web page or the like, a switch between web pages and scrolling in respective pages; when displaying a list of music tunes, a switch between albums and scrolling music tunes in an album; when playing back a music tune, a switch between albums, and a switch between music tunes in an album; and when playing back a moving image, a switch between moving image files and a switch between scenes included in a moving image file. This allows a user to select appropriate operational input in accordance with the granularity of information to be switched, which can provide a user with an environment where display targets can be readily and quickly switched, thus user friendliness can be improved.

Figure 18:
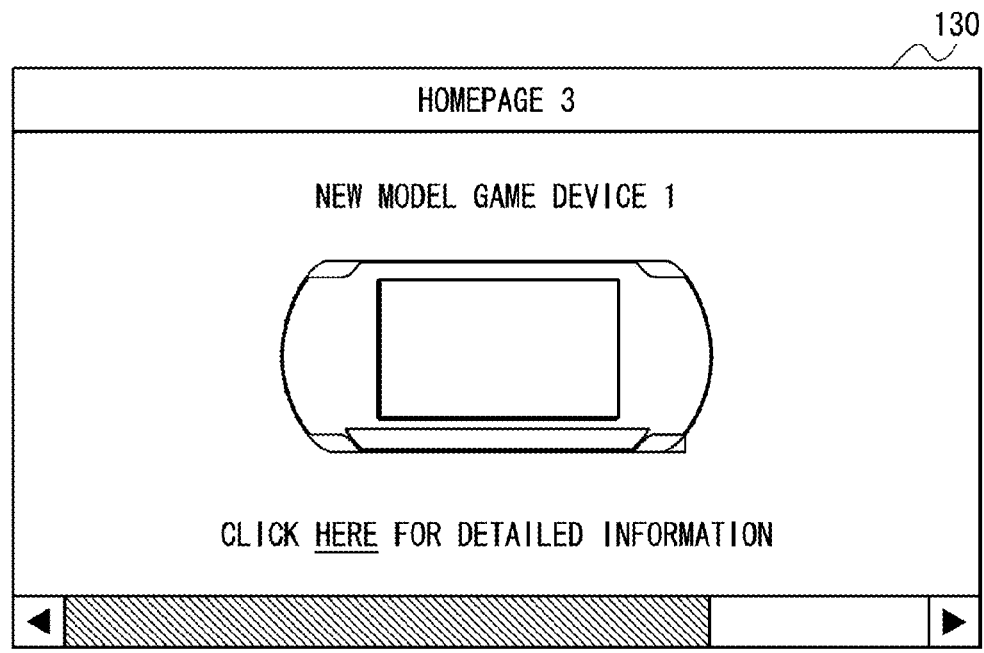
FIG. 18 shows an exemplary screen image that the display control unit displays on the display device.
Figure 19:
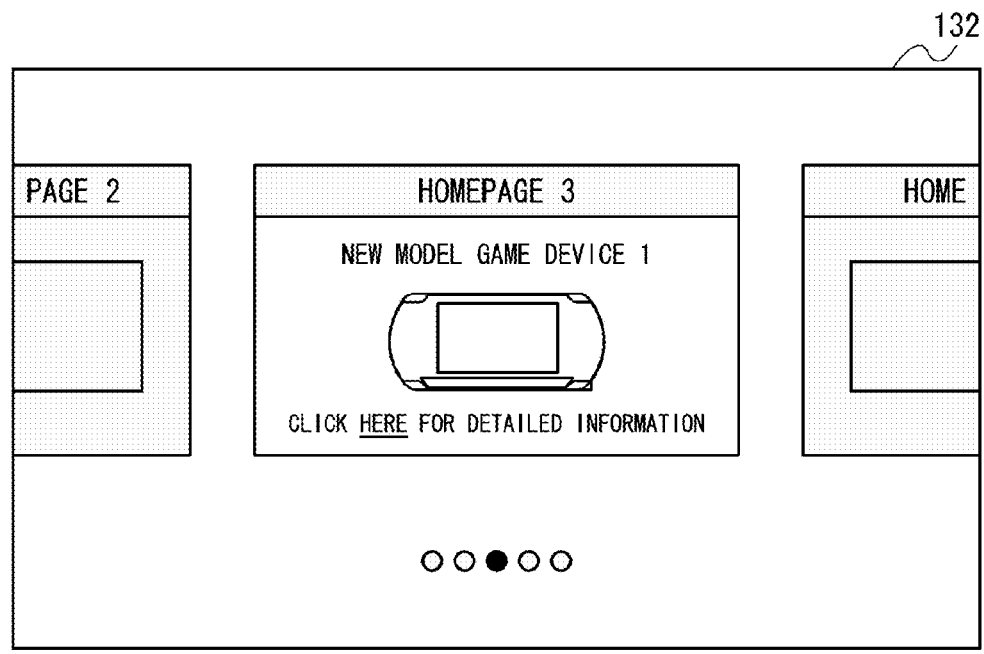
FIG. 19 shows an exemplary screen image that the display control unit displays on the display device.

FIG. 18 shows an exemplary screen image that the display control unit displays on the display device. In the example shown in FIG. 18, a web page of "home page 3" is displayed on a browser screen image 130. Conventionally, a technology has been generally used where a switching screen image 132 as shown in FIG. 19 is displayed by a predetermined operation and a browser screen to be displayed is selected in order to switch display targets among a plurality of browser screens.

Figure 20:
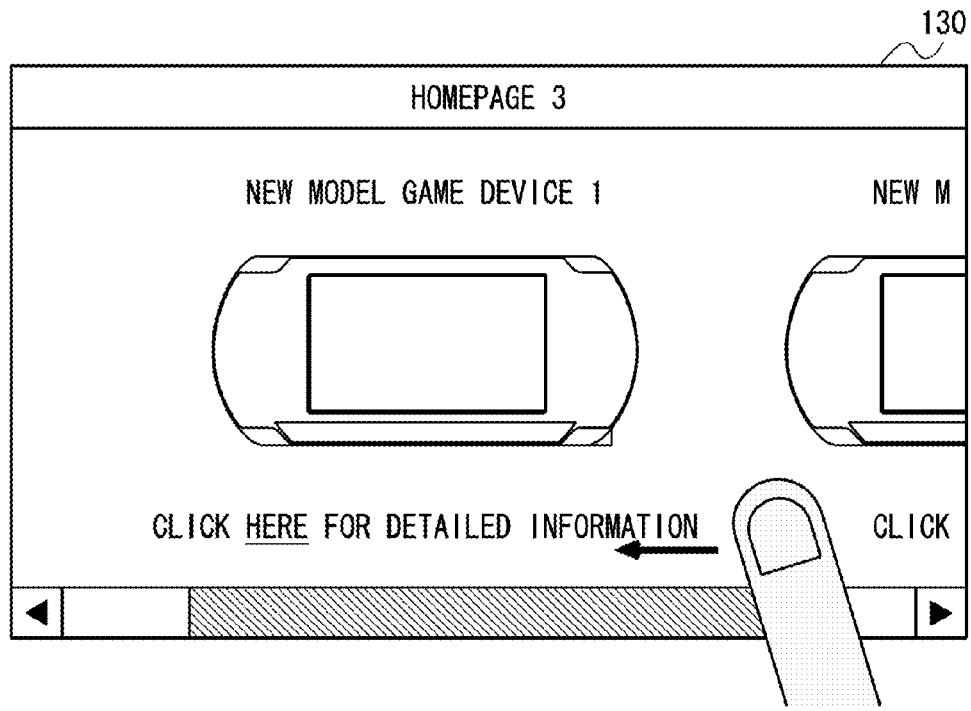
FIG. 20 shows an exemplary screen image that the display control unit displays on the display device.

FIG. 20 shows an exemplary screen image that the display control unit displays on the display device. In the example shown in FIG. 20, if the input acquiring unit 41 acquires input for indication a direction on the touch panel 69, the switch control unit 46 instructs an application 42 of a browser to scroll display targets in the page.

Figure 21:
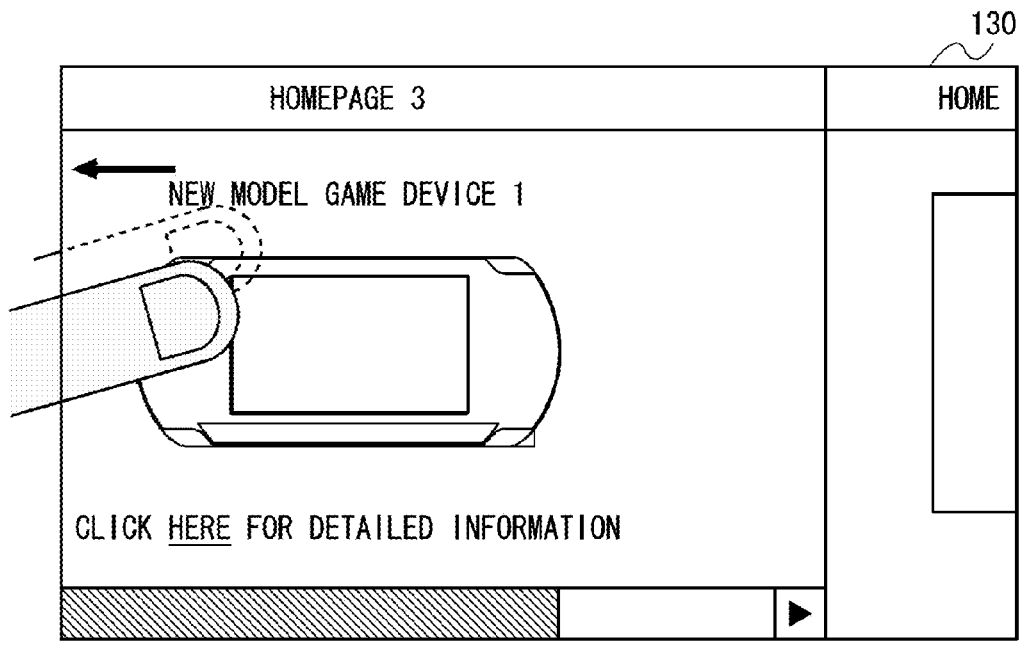
FIG. 21 shows an exemplary screen image that the display control unit displays on the display device.

FIG. 21 shows an exemplary screen image that the display control unit displays on the display device. In the example shown in FIG. 21, if a user touches the touch panels as if pinching the display screen of the display device 68, for example if a user touches the touch panel 69 with a thumb and touches the rear touch panel 70 with an index finger, and moves the thumb and the index finger in a same direction simultaneously as if pinching and moving the screen, the input acquiring unit 41 acquires input for indicating direction at same positions or positions within a predetermined range on the touch panel 69 and on the rear touch panel 70. In this process, the switch control unit 46 instructs the application 42 of an browser to switch web pages that are displayed on the browser screen image 130.

In this manner, the switch control unit 46 allocates operational input only on the touch panel 69 to scrolling in a web page, and allocates operational input on both of the touch panel 69 and the rear touch panel 70 to a switch between web pages, respectively. This allows operational input such as pinching a web page to cause switching to another web page, which can provide an environment for operation that can be easily understood intuitively. Further, a new operation method is introduced where a web page is pinched and moved while maintaining a conventional operation method where a display target is scrolled in a web page by input for indicating direction on the touch panel 69. Therefore, an environment for operation that is friendly to a user who has become familiar with a conventional operation method can be provided. In case that the application 42 of a browser displays web pages on a plurality of tabs respectively, the switch control unit 46 may switch tabs displayed on the browser screen image 130 by input for indication a direction on both of the touch panel 69 and the rear touch panel 70.

Figure 22:
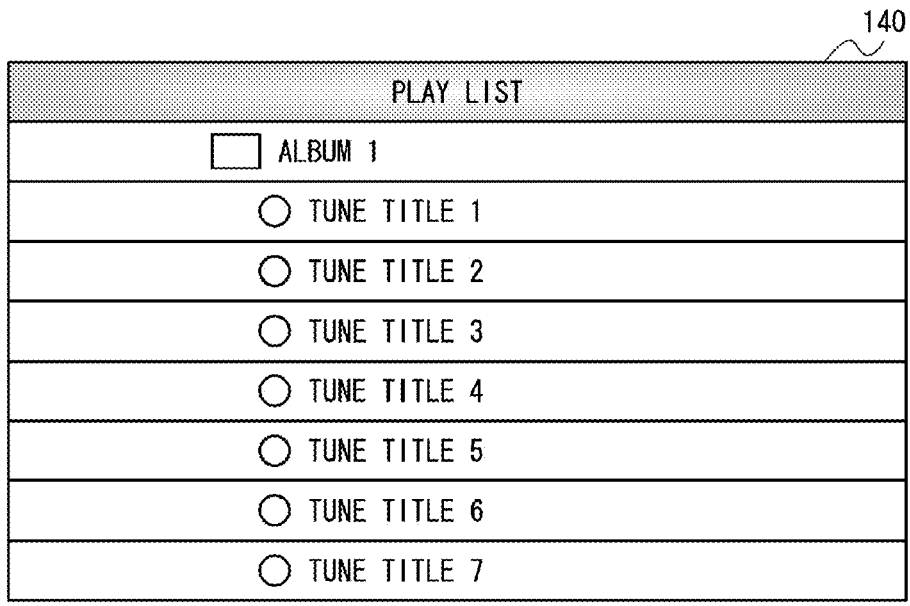
FIG. 22 shows an exemplary screen image that the display control unit displays on the display device.

FIG. 22 shows an exemplary screen image that the display control unit displays on the display device. In the example shown in FIG. 22, titles of tunes include in the "album 1" are displayed on a play list screen image 140.

Figure 23:
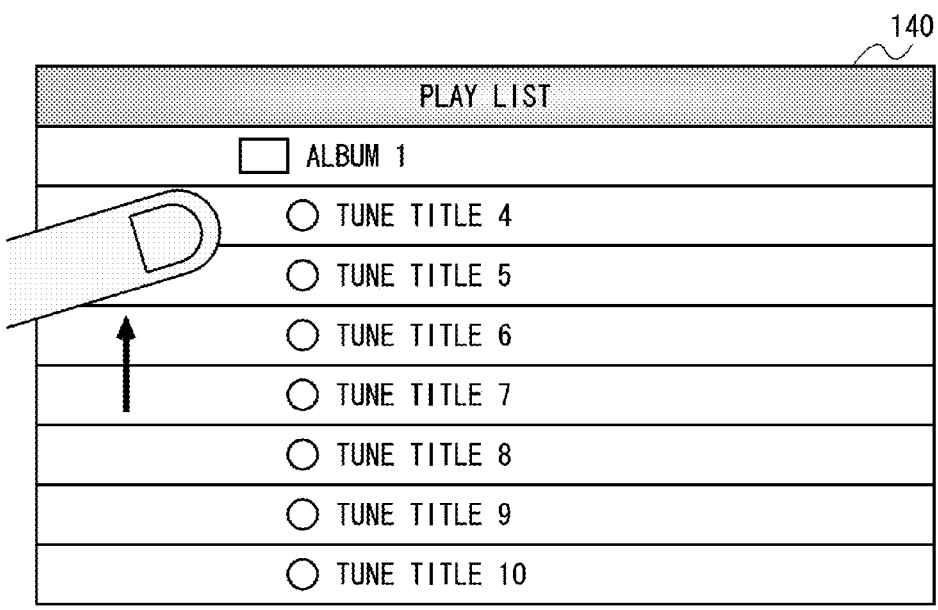
FIG. 23 shows an exemplary screen image that the display control unit displays on the display device.

As shown in FIG. 23, if a user inputs indication of a vertical direction on the touch panel 69, the switch control unit 46 instructs an application 42 for managing music tunes to scroll the list of music tunes included in the album. Although music tunes of "tune title 1"-"tune title 7" are displayed on the screen image in FIG. 22, the display targets are switched to the music tunes of "tune title 4"-"tune title 10" on the screen image in FIG. 23.

Figure 24:
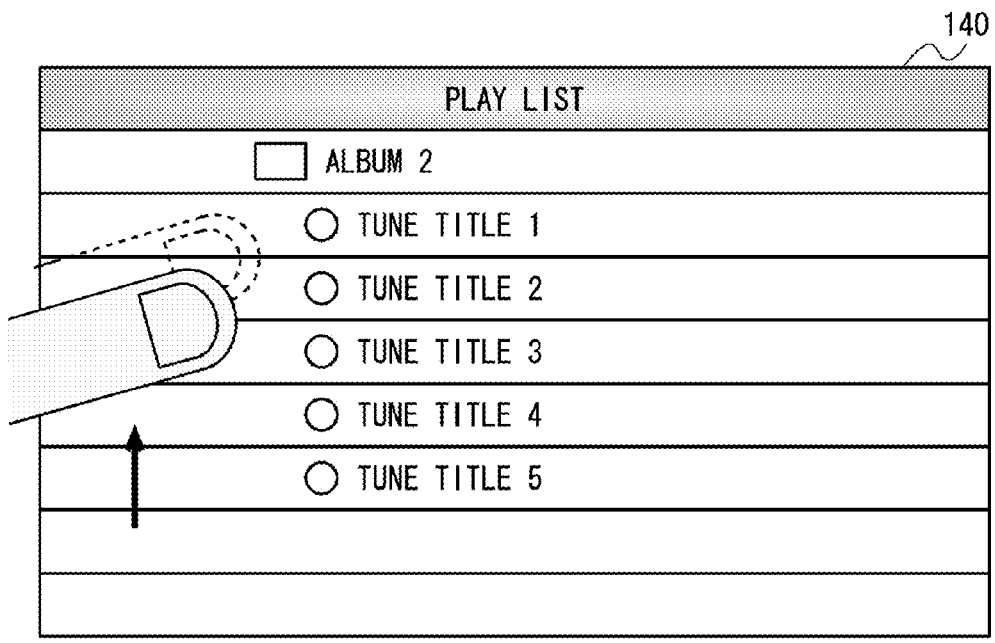
FIG. 24 shows an exemplary screen image that the display control unit displays on the display device.

As shown in FIG. 24, if a user inputs indication of a vertical direction both on the touch panel 69 and on the rear touch panel 70, the switch control unit 46 instructs the application 42 for managing music tunes to switch albums to be displayed. Although the list of music tunes of "album 1" is displayed on the screen image in FIG. 23, the display target is switched to the list of music tunes of "album 2" on the screen image in FIG. 24.

Figure 25:
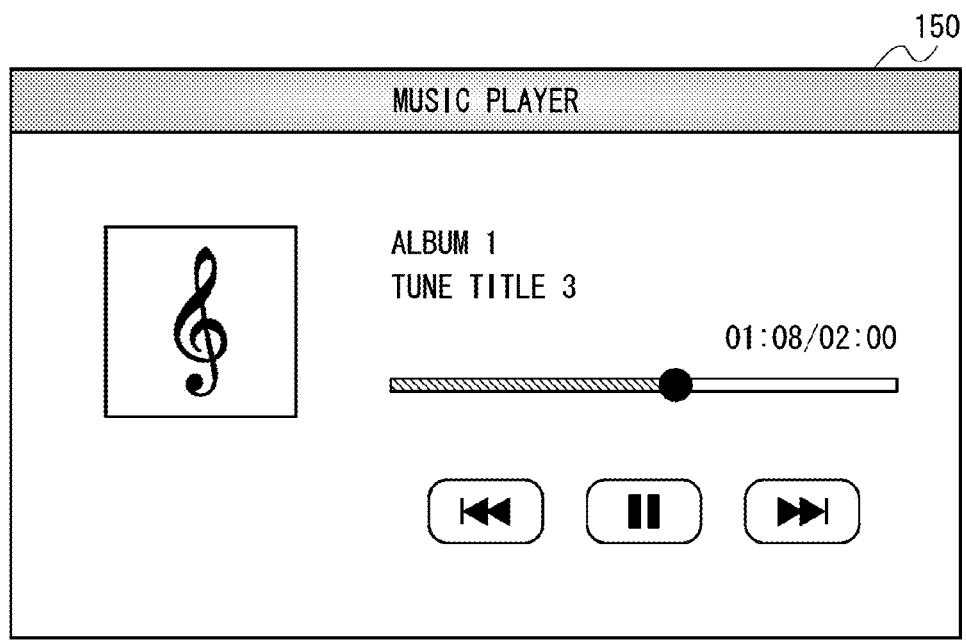
FIG. 25 shows an exemplary screen image that the display control unit displays on the display device.

FIG. 25 shows an exemplary screen image that the display control unit displays on the display device. In the example shown in FIG. 25, information on the music tune of "tune title 3" in the "album 1" is displayed on the music play-back screen image 150 as a music tune that is being played.

Figure 26:
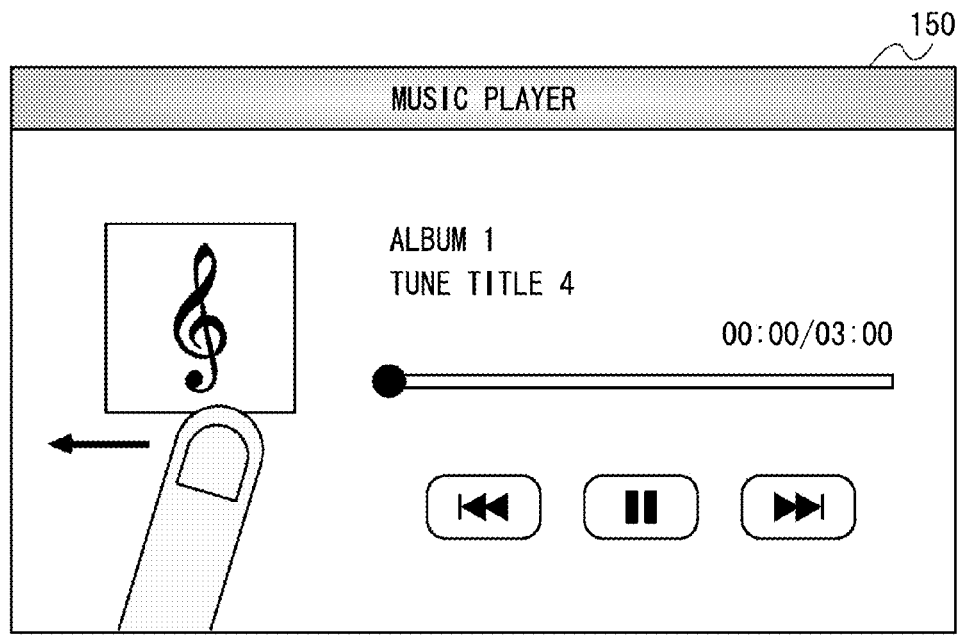
FIG. 26 shows an exemplary screen image that the display control unit displays on the display device.

As shown in FIG. 26, if a user inputs indication of a horizontal direction on the touch panel 69, the switch control unit 46 instructs the application 42 for managing music tunes to switch the target tune to be played to a previous music tune or to a subsequent music tune in the album. Although the music tune of "tune title 3" included in the "album 1" has been played back in FIG. 25, the target to be played back is switched to the music tune of "tune title 4" included in the same "album 1" in FIG. 26.

Figure 27:
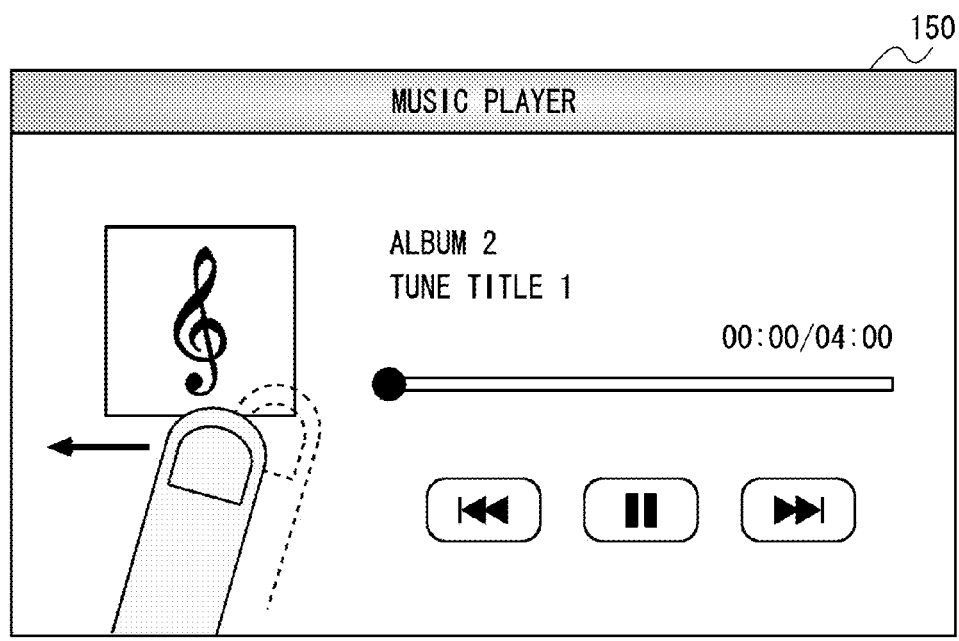
FIG. 27 shows an exemplary screen image that the display control unit displays on the display device.

As shown in FIG. 27, if a user inputs indication of a horizontal direction both on the touch panel 69 and on the rear touch panel 70, the switch control unit 46 instructs the application 42 for managing music tunes to switch albums to be played back. Although the music tune of "tune title 3" included in the "album 1" has been played back in FIG. 25, the target to be played back is switched to the music tune of "tune title 1" included in the "album 2" in FIG. 27.

Figure 28:
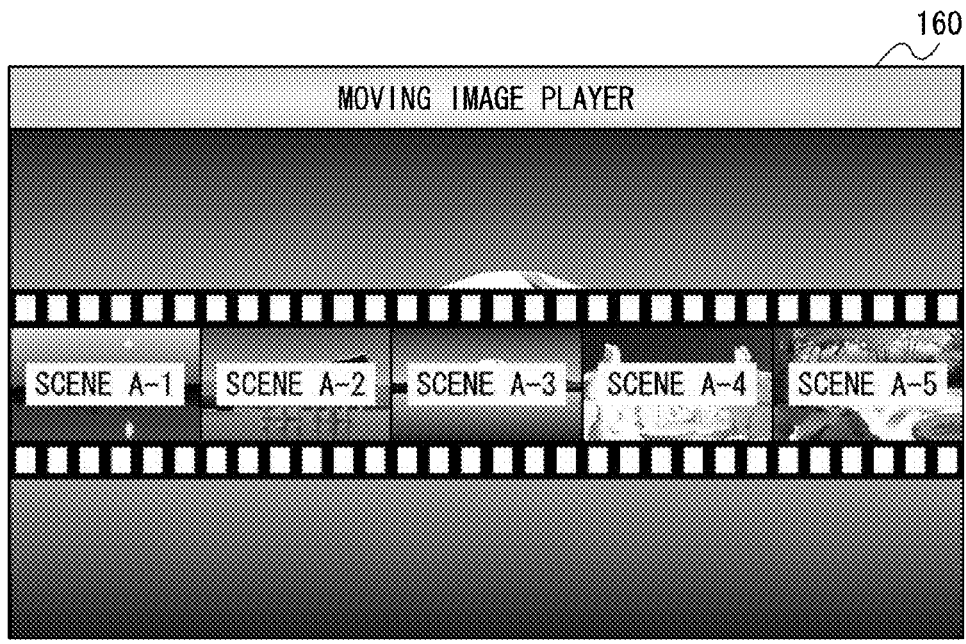
FIG. 28 shows an exemplary screen image that the display control unit displays on the display device.

FIG. 28 shows an exemplary screen image that the display control unit displays on the display device. In the example shown in FIG. 28, an image at a certain time point of a moving image being played back is displayed on the background of the moving image scene selection screen image 160, and thumbnails of other scenes ("scene A-1"-"scene A-5") in the moving image are displayed on the front thereof. In this specification, a "scene" refers to one part of the moving image divided for example in accordance with a unit of time (for example, 1 minute or 10 minutes), meaning of the moving image (story 1, act 1), comments from user, etc.

Figure 29:
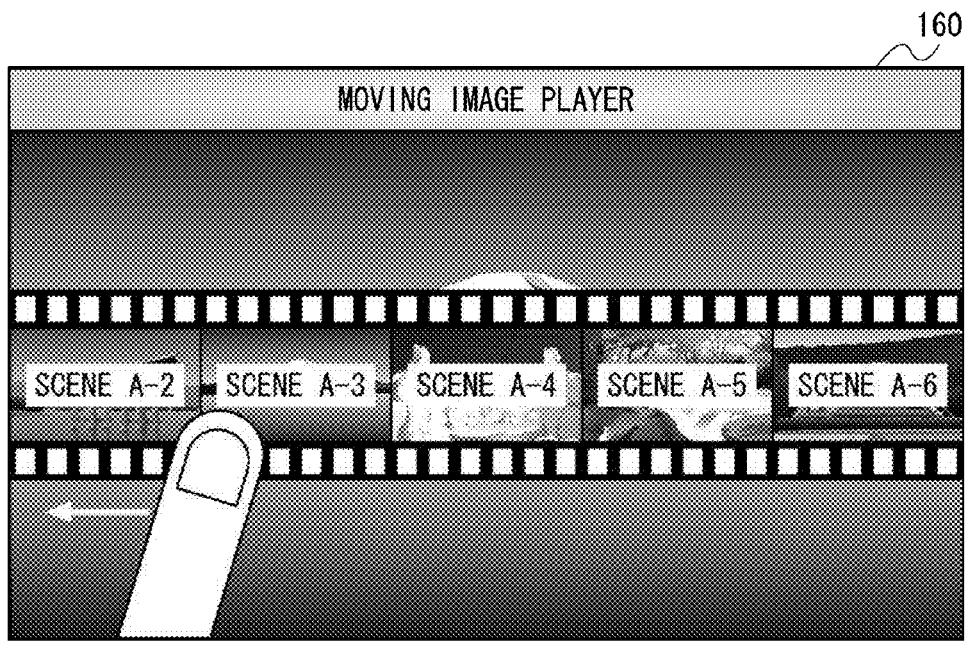
FIG. 29 shows an exemplary screen image that the display control unit displays on the display device.

As shown in FIG. 29, if a user inputs indication of a horizontal direction on the touch panel 69, the switch control unit 46 instructs the application 42 for playing back a moving image to scroll the list of thumbnails of still images of the scenes. Although thumbnails of still images of "scene A-1"-"scene A-5" are displayed on the screen image in FIG. 28, the display targets are switched to thumbnails of still images of "scene A-2"-"scene A-6" on the screen image in FIG. 29.

Figure 30:
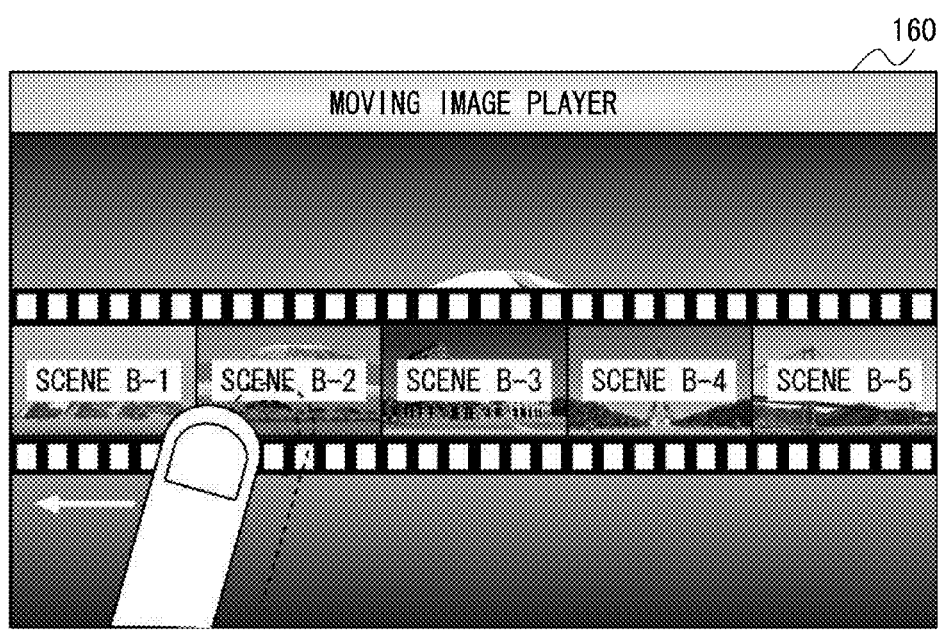
FIG. 30 shows an exemplary screen image that the display control unit displays on the display device.

As shown in FIG. 30, if a user inputs indication of a horizontal direction both on the touch panel 69 and on the rear touch panel 70, the switch control unit 46 instructs the application 42 for playing back a moving image to switch moving images to be played back. Although thumbnails of still images included in "scene A-1"-"scene A-5" of a certain moving image file are displayed on the screen image in FIG. 25, the display targets are switched to thumbnails of still images included in "scene B-1"-"scene B-5" of another moving image on the screen image in FIG. 30. If a user inputs indication of a horizontal direction both on the touch panel 69 and on the rear touch panel 70, the switch control unit 46 may scroll the list of thumbnails of still images of scenes while handling a plurality of scenes as a unit of scrolling. For example, the switch control unit 46 may scroll the thumbnails for each ten scenes, or for each group of scenes as a unit.

The switch control unit 46 may not switch display targets in the upper layer until the input acquiring unit 41 acquires long push input for or more than a predetermined time period, at positions within a predetermined range both on the touch panel 69 and on the rear touch panel 70, and the switch control unit 46 may switch a mode to a mode where display targets in the upper layer are switched if the input acquiring unit 41 acquires long push input for or more than a predetermined time period. When the mode is switched to the mode where display targets are changed in the upper layer, the switch control unit 46 may visually send feed back regarding the change of mode for example by displaying a graphic symbol near the input position. This can prevent the occurrence of a malfunction.

The game device 10 according to the exemplary embodiment is typically used by a user while the user holds the device 10 with his/her both hands. Therefore, for example when inputting multi-swipe input or the like, the user has to detach one of the hands from the device once in order to input. By contrast, an input method is used where the touch panel 69 and the rear touch panel 70 are pinched by two fingers or by a finger and a thumb and contact points are moved concurrently in accordance with the exemplary embodiment. Thus, a user can input while holding the device 10 with his/her both hands. This improves user friendliness.

Figure 31:
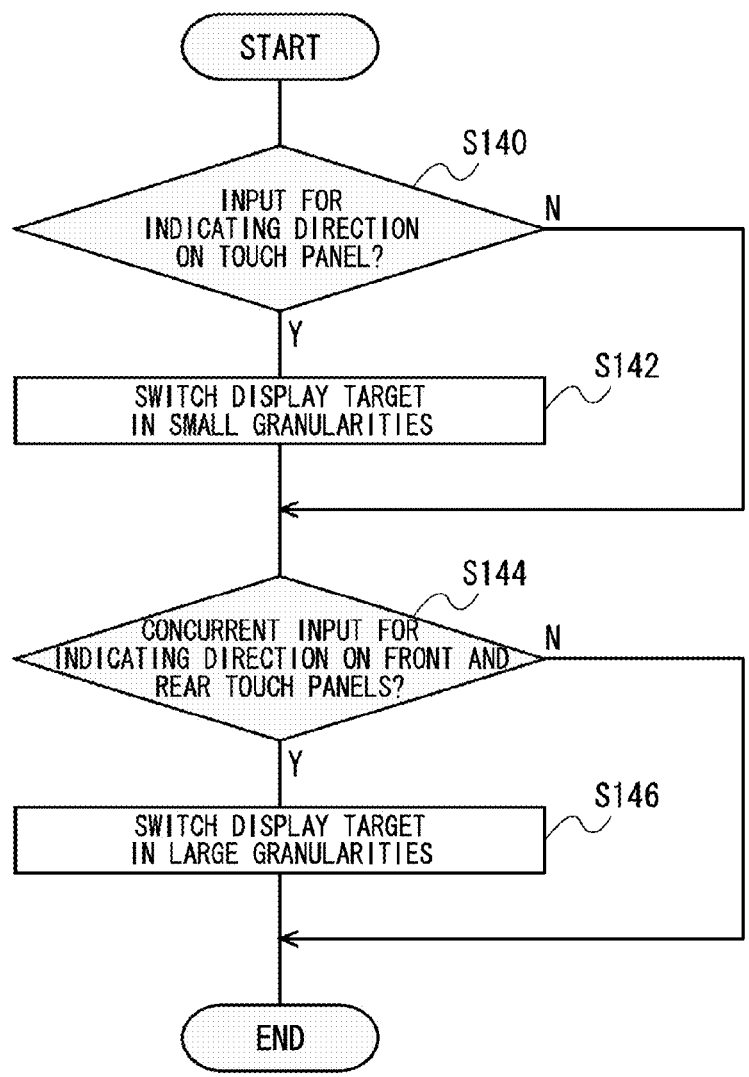
FIG. 31 shows a flowchart indicating a procedure of an input control method according to an exemplary embodiment.

FIG. 31 shows a flowchart indicating a procedure of an input control method according to the exemplary embodiment. The flowchart shown in FIG. 31 indicates a procedure of controlling a switch of display targets. If the input acquiring unit 41 acquires input for indicating a direction on the touch panel 69 and/or the rear touch panel 70 (Y in S140), the switch control unit 46 switches display targets in small granularities in the direction indicated by the input (S142). If the input for indicating a direction on the touch panel 69 and/or the rear touch panel 70 is not acquired (N in S140), the step S142 will be skipped. If the input acquiring unit 41 acquires concurrent input entries for indicating a direction on the touch panel 69 and on the rear touch panel 70 (Y in S144), the switch control unit 46 switches display targets in the direction indicated by the input with granularities larger than that when the input for indicating a direction is made on only one of the touch panels (S146). If concurrent input for indicating a direction on both the touch panel 69 and the rear touch panel 70 is not acquired (N in S144), the step S146 will be skipped.

Given above is an explanation based on the exemplary embodiment. The exemplary embodiment is intended to be illustrative only and it will be obvious to those skilled in the art that various modifications to constituting elements and processes could be developed and that such modifications are also within the scope of the present invention.

When a user holds the game device 10 according to the exemplary embodiment, it is assumed that a plurality of fingers and/or one or more thumb often contact the rear touch panel 70. Therefore in case of allocating input on the rear touch panel 70 to the first input entry, for example, the rear touch panel 70 may be divided into a right side area and a left side area. During a plurality of taps are acknowledged on respective areas, the taps may not be determined to be the first input entry, and if a single tap continuing more than or equal to a predetermined time is acknowledged either area, the tap may be determined to be the first input entry. For example, if a user wants to define as the center position a position displayed on the left side area of the display screen of the display device 68, the user detaches fingers of his/her left hand from the rear touch panel 70 once and taps the position that the user want to set as the center position with a single finger or thumb. The deformation control unit 45 acquires a single tap on the left side area of the rear touch panel 70 continuing more than or equal to a predetermined time, and determines the input as the first input entry, accordingly. This can prevent the occurrence of a malfunction.

10 game device, 20 input device, 40 control unit, 41 input acquiring unit, 42 application, 43 display control unit, 44 movement control unit, 45 deformation control unit, 46 switch control unit, 60 data retaining unit, 66 screen image generating unit, 68 display device, 69 touch panel, 70 rear touch panel, 71 front camera, 72 rear camera, 75 tri-axial gyro sensor, and 76 tri-axial acceleration sensor.

What is claimed is:

1. An input control program embedded on a non-transitory computer-readable recording medium, allowing a computer to function as:
   a display control unit operative to display a plurality of display targets on a display screen of a display device;
   an acquiring unit operative to acquire a position of input from an input device, which can detect input on the display screen; and
   a movement control unit operative to define as a target to be moved a display target displayed by the display control unit on the display screen at a position corresponding to the position of a first input entry acquired by the acquiring unit, and operative to scroll a display target other than the target to be moved in accordance with a second input entry acquired by the acquiring unit while keeping the display position of the target to be moved at the position of the first input entry,
   wherein the first input entry is made on a front touch panel or a rear touch panel and the second input entry is made on the other ouch panel, and
   wherein the second input entry is made at any location on the front touch panel or the rear touch panel.

2. The input control program according to claim 1, wherein the acquiring unit acknowledges as the first input entry an input entry made for a time period greater than or equal to a predetermined time period at the position corresponding to the display position of the target to be moved on the front touch panel or the rear touch panel,
   wherein the front touch panel is provided with the display screen of the display device and the rear touch panel is provided on the backside of the display screen.

3. The input control program according to claim 1, wherein the acquiring unit acknowledges as the first input entry input entries made concurrently at positions corresponding to the display position of the target to be moved on the front touch panel and the rear touch panel,
   wherein the front touch panel is provided with the display screen of the display device and the rear touch panel is provided on the backside of the display screen.

4. The input control program according to claim 2, wherein the acquiring unit acknowledges as the first input entry an input entry on either of the front touch panel or the rear touch panel, and acknowledges as the second input entry flick input, drag input, or swipe input on the other touch panel.

5. The input control program according to claim 3, wherein the acquiring unit acknowledges as the second input entry flick input, drag input, or swipe input on either of the front touch panel or the rear touch panel.

6. The input control program according to claim 1, wherein the display control unit displays, during a period while the movement control unit keeps the display position of the target to be moved at the position of the first input entry, the target to be moved in a manner different from that of other period.

7. The input control program according to claim 2, wherein the display control unit displays, during a period while the movement control unit keeps the display position of the target to be moved at the position of the first input entry, the target to be moved in a manner different from that of other period.

8. The input control program according to claim 3, wherein the display control unit displays, during a period while the movement control unit keeps the display position of the target to be moved at the position of the first input entry, the target to be moved in a manner different from that of other period.

9. The input control program according to claim 4, wherein the display control unit displays, during a period while the movement control unit keeps the display position of the target to be moved at the position of the first input entry, the target to be moved in a manner different from that of other period.

10. The input control program according to claim 5, wherein the display control unit displays, during a period while the movement control unit keeps the display position of the target to be moved at the position of the first input entry, the target to be moved in a manner different from that of other period.

11. An input control device comprising:
   a display control unit operative to display a plurality of display targets on a display screen of a display device;
   an acquiring unit operative to acquire a position of input from an input device, which can detect input on the display screen; and
   a movement control unit operative to define as a target to be moved a display target displayed by the display control unit on the display screen at a position corresponding to the position of a first input entry acquired by the acquiring unit, and operative to scroll a display target other than the target to be moved in accordance with a second input entry acquired by the acquiring unit while keeping the display position of the target to be moved at the position of the first input entry,
   wherein the first input entry is made on a front touch panel or a rear touch panel and the second input entry is made on the other touch panel, and
   wherein the second input entry is made at any location on the front touch panel or the ear touch panel.

12. An input control method comprising:
   displaying a plurality of display targets on a display screen of a display device;
   acquiring a position of input from an input device, which can detect input on the display screen; and
   defining as a target to be moved a display target displayed on the display screen at a position corresponding to the position of a first input entry acquired, and scrolling a display target other than the target to be moved in accordance with a second input entry acquired while keeping the display position of the target to be moved at the position of the first input entry,
   wherein the first input entry is made on a front touch panel or a rear touch panel and the second input entry is made on the other ouch panel, and
   wherein the second input entry is made at any location on the front touch panel or the rear touch panel.

13. A non-transitory computer readable recording medium encoded with the program according to claim 1.

* * * * *